(12) United States Patent
Chu

(10) Patent No.: US 10,928,253 B2
(45) Date of Patent: Feb. 23, 2021

(54) DUAL-SENSOR WATERPROOF TEMPERATURE MONITORING PROBE AND ASSOCIATED SYSTEMS AND METHODS

(71) Applicant: Ewig Industries Macao Commercial Offshore Limited, Macau (CN)

(72) Inventor: Luk Wah Jackson Chu, Hong Kong (CN)

(73) Assignee: Ewig Industries Macao Commercial Offshore Limited, Macau (CN)

( * ) Notice: Subject to any disclaimer, the term of this patent is extended or adjusted under 35 U.S.C. 154(b) by 0 days.

(21) Appl. No.: 16/159,411

(22) Filed: Oct. 12, 2018

(65) Prior Publication Data

US 2019/0049314 A1 Feb. 14, 2019

Related U.S. Application Data

(63) Continuation-in-part of application No. 15/652,557, filed on Jul. 18, 2017.

(51) Int. Cl.
*G01K 7/00* (2006.01)
*G01K 1/08* (2021.01)
*G01K 13/00* (2021.01)

(52) U.S. Cl.
CPC .............. *G01K 1/08* (2013.01); *G01K 13/00* (2013.01)

(58) Field of Classification Search
CPC combination set(s) only.
See application file for complete search history.

(56) References Cited

U.S. PATENT DOCUMENTS

| 3,497,398 | A | | 2/1970 | Ehrenberg et al. |
| 3,923,552 | A | * | 12/1975 | Parris ........................ G01K 1/08 136/234 |
| 4,291,576 | A | | 9/1981 | Deane |
| 4,527,909 | A | * | 7/1985 | Dale ........................ G01K 1/08 136/230 |
| 6,811,308 | B2 | | 11/2004 | Chapman et al. |
| 7,004,626 | B1 | | 2/2006 | Giberson et al. |
| 2004/0258129 | A1 | | 12/2004 | Rund |
| 2006/0054558 | A1 | | 3/2006 | Jones et al. |
| 2007/0258506 | A1 | | 11/2007 | Schwagerman et al. |
| 2008/0043809 | A1 | * | 2/2008 | Herbert ................... G01K 1/026 374/163 |

(Continued)

OTHER PUBLICATIONS

Non-Final Rejection in U.S. Appl. No. 15/785,392 dated Apr. 6, 2018, 16 pp.

(Continued)

*Primary Examiner* — Lisa M Caputo
*Assistant Examiner* — Nasir U. Ahmed
(74) *Attorney, Agent, or Firm* — Lathrop GPM LLP

(57) ABSTRACT

In an aspect, a dual-sensor waterproof temperature monitoring probe includes a first hollow tube having a first end and a second end. A first temperature sensor is located within the first hollow tube proximate the first end. A second temperature sensor located within a second hollow tube having a first end and a second end. The second hollow tube has a shorter length than the first hollow tube. A rechargeable power source is located in the first hollow tube proximate the first end. A handle permanently seals the second end of each of the first and second hollow tubes.

20 Claims, 16 Drawing Sheets

(56) References Cited

U.S. PATENT DOCUMENTS

| | | | | |
|---|---|---|---|---|
| 2008/0259995 | A1* | 10/2008 | Kuhn | G01K 7/32 |
| | | | | 374/152 |
| 2013/0149884 | A1 | 6/2013 | Shaw | |
| 2013/0182745 | A1 | 7/2013 | Hertel et al. | |
| 2013/0329767 | A1* | 12/2013 | Jambor | G01K 1/08 |
| | | | | 374/185 |
| 2014/0005508 | A1* | 1/2014 | Estes | A61B 5/1495 |
| | | | | 600/347 |
| 2014/0086274 | A1* | 3/2014 | Henke | G01K 1/026 |
| | | | | 374/142 |
| 2014/0298903 | A1* | 10/2014 | Goto | G01F 23/22 |
| | | | | 73/292 |
| 2015/0168232 | A1* | 6/2015 | Chu | G01K 13/00 |
| | | | | 374/208 |
| 2016/0004956 | A1* | 1/2016 | Reynolds | G01K 13/00 |
| | | | | 377/15 |

OTHER PUBLICATIONS

Non-Final Rejection in U.S. Appl. No. 15/652,557 dated May 20, 2020, 9 pp.

\* cited by examiner

SECTION A-A

SECTION A—A

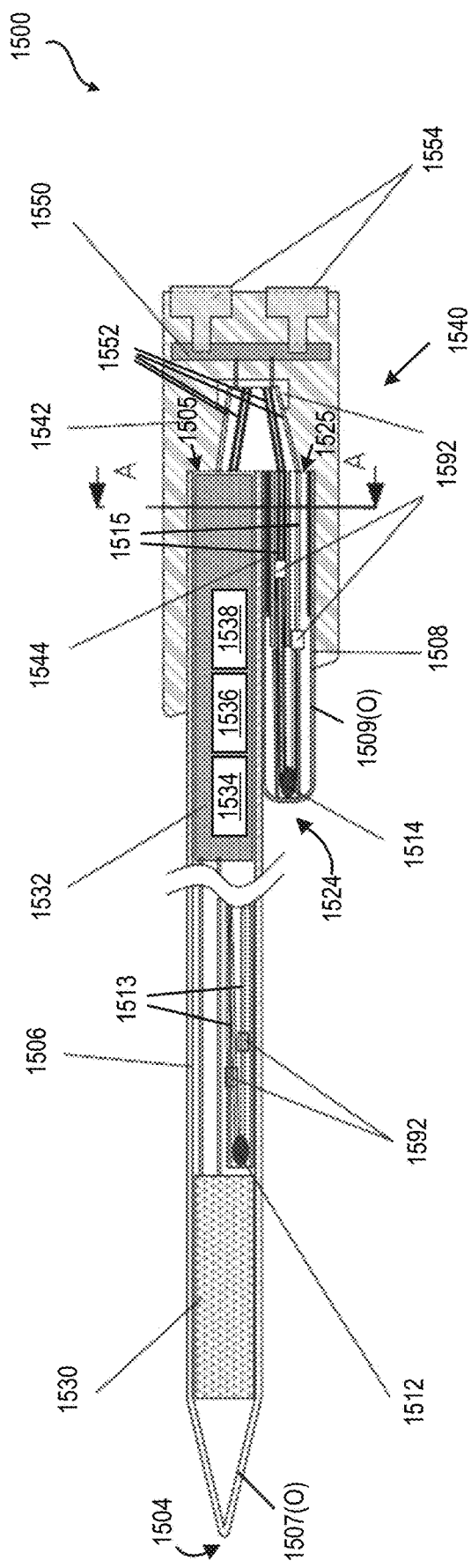
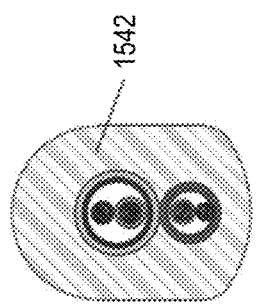
FIG. 15A
FIG. 15B

DUAL-SENSOR WATERPROOF TEMPERATURE MONITORING PROBE AND ASSOCIATED SYSTEMS AND METHODS

RELATED APPLICATIONS

This application is a continuation-in-part of U.S. patent application Ser. No. 15/652,557, filed on Jul. 18, 2017 and which is incorporated by reference herein in its entirety.

FIELD OF THE INVENTION

This invention relates generally to cooking accessories and specifically to waterproof food thermometer probes and associated methods of manufacturing such probes.

BACKGROUND

Accurate measurement of meat temperature is critical for preventing food-borne illnesses and fatalities. To this end, thermometer probes have gained popularity for grilling and baking purposes. Temperature probe products are generally separated into two categories: "leave-in" probes and "instant read" thermometers. Instant read thermometers allow temperature to be read quickly when inserted into meat. However, these thermometers should not remain in a food during cooking, since any plastic covering cannot withstand high temperatures utilized during cooking. Leave-in probes are designed to remain in a food during cooking, but often fail when moisture enters the probe where the display-unit cable connects to the probe. Such probes fail when washed in an automatic dishwasher, making them a hassle to clean.

SUMMARY

In an aspect, a dual-sensor waterproof temperature monitoring probe includes: a hollow tube formed with a first diameter at a first end and a second diameter at a second end; a first temperature sensor located within the hollow tube at the first end; a second temperature sensor located within the hollow tube at the second end; a temperature sensor holder configured to fit within the second diameter of the hollow tube and to position the second temperature sensor adjacent an inside surface of the hollow tube; one or more first electrical wires electrically coupled with the first temperature sensor; one or more second electrical wires electrically coupled with the second temperature sensor; and a handle permanently sealing the hollow tube at the second end and sealing around the first and second electrical wires.

In an embodiment, the hollow tube further includes a pointed tip at the first end. In an embodiment, the hollow tube further includes a transition between the first diameter and the second diameter. In an embodiment, the transition includes a taper. In an embodiment, the taper is linear, concave, or convex.

In an embodiment, the handle prevents water from entering the hollow tube and being capable of substantially retaining structural and chemical integrity at temperatures up to about 500 degrees Fahrenheit.

In an embodiment, the temperature sensor holder includes a central groove for capturing the second temperature sensor and for positioning the second temperature sensor adjacent the inside surface of the hollow tube.

In an embodiment, the central groove is straight. In another embodiment, the central groove has an internal angle, the internal angle shaped to tightly fit the second temperature sensor.

In an embodiment, the central groove is formed by folding material of the temperature sensor holder.

In an embodiment, the probe further includes a thermally conductive material for providing a thermal coupling between the inner surface of the hollow tube and the second temperature sensor.

In an embodiment, the probe further includes an adhesive, the adhesive being between the second temperature sensor and the temperature sensor holder.

In an embodiment, the temperature sensor holder further includes additional passages, the additional passages being capable of having the one or more second electrical wires pass therethrough. In another embodiment, the temperature sensor holder is formed of an electrically insulating material. In another embodiment, the temperature sensor holder has an electrically insulating coating.

In another aspect, a dual-sensor waterproof temperature monitoring probe includes: a primary hollow tube having a first open end and a first closed end; an auxiliary hollow tube having a shorter length than the primary hollow tube, the auxiliary hollow tube having a second open end and a second closed end, and the auxiliary tube being positioned parallel to and adjacent to the primary hollow tube; a first temperature sensor located inside the primary hollow tube at the first closed end.

A second temperature sensor may be located inside the auxiliary hollow tube at the second closed end; one or more first electrical wires electrically coupled with the first temperature sensor; one or more second electrical wires electrically coupled with the second temperature sensor; a cable, the cable including the one or more first electrical wire and the one or more second electrical wires; and a handle permanently covering and permanently sealing the first open end and the second open end and around at least part of the cable.

In an embodiment, the first open end of the primary hollow tube includes a pointed tip.

In an embodiment, the primary and the auxiliary hollow tubes are coupled together by an adhesive. In another embodiment, the primary and the auxiliary hollow tubes are coupled together by welding.

In an embodiment, the auxiliary hollow tube has a smaller diameter than the primary hollow tube. In an embodiment, the first open end and second open end are flush with each other.

In an embodiment, the handle prevents water from entering the primary and auxiliary hollow tubes and is capable of substantially retaining structural and chemical integrity at temperatures up to about 500 degrees Fahrenheit.

In another aspect, a method for manufacturing a dual-sensor waterproof temperature monitoring probe includes: manufacturing a hollow tube, the hollow tube having a first diameter at a first end and a second diameter at a second; positioning a first temperature sensor within the hollow tube at the first end, the first temperature sensor being electrically coupled to one or more first electrical wires; forming a temperature sensor holder with a central groove capable of fitting a second temperature sensor; positioning the second temperature sensor within the central groove, the second temperature sensor being electrically coupled to one or more second electrical wires; inserting the temperature sensor holder inside a hollow tube such that the second temperature sensor is adjacent an inner surface of the hollow tube. In an embodiment of this method, the temperature sensor holder includes an electrically insulating material. In an embodiment of this method, the temperature sensor includes an electrically conducting material and an electrically insulating coating. In an embodiment of this method, the step of manufacturing the temperature sensor holder further includes injecting a material into a mold to form the temperature sensor holder with the central groove. In an embodiment of this method, the step of manufacturing the temperature sensor holder further includes applying pressure and/or heat to a flat material to form the temperature sensor holder with the central groove. In an embodiment of this method, the step of manufacturing the temperature sensor holder further includes forming one or more additional grooves in the temperature sensor holder. In an embodiment of this method, the method further includes applying a thermally conductive paste between the temperature sensor and the inner surface of the hollow tube. In an embodiment of this method, the central groove has an internal angle capable of tightly fitting the second temperature sensor. In an embodiment of this method, the method further includes forming a handle, the handle permanently sealing the hollow tube at the second end and sealing around the one or more first and second electrical wires, the handle further preventing water from entering the hollow tube and being capable of substantially retaining structural and chemical integrity at temperatures up to about 500 degrees Fahrenheit. In an embodiment of this method, the hollow tube further includes a transition between the first diameter and the second diameter, the transition comprising a taper. In an embodiment of this method, the taper is linear, concave, or convex.

In another aspect, a method for manufacturing a dual-sensor waterproof temperature monitoring probe includes: manufacturing a primary hollow tube and an auxiliary hollow tube, the primary hollow tube having a first open end and a first closed end, the auxiliary hollow tube having a second open end and a second closed end, the auxiliary hollow tube having a shorter length than the primary hollow tube; attaching the auxiliary hollow tube to the primary hollow tube, the auxiliary hollow tube being parallel to the primary hollow tube; positioning a first and a second temperature sensor within the primary and the auxiliary hollow tubes, respectively, the first and second temperature sensors being electrically coupled to one or more first and second electrical wires, respectively; forming a cable, the couple comprising the one or more first and second electrical wires; and forming a handle, the handle permanently sealing the hollow tube at the second end and sealing around the one or more first and second electrical wires, the handle further preventing water from entering the hollow tube and being capable of substantially retaining structural and chemical integrity at temperatures up to about 500 degrees Fahrenheit. In an embodiment of this method, the method further includes inserting a first glass fiber tube the primary hollow tube and inserting a second glass fiber tube within the auxiliary hollow tube. In an embodiment of this method, the method further includes securing a primary first seal within the primary hollow tube and an auxiliary first seal within the auxiliary hollow tube, the primary and auxiliary first seals each comprising a heat-shrink material covering a portion of the cable and a portion of the primary and auxiliary hollow tubes, respectively, at the first open end and second end, respectively.

BRIEF DESCRIPTION OF THE FIGURES

FIG. 15A-B depict an exemplary wireless dual-sensor waterproof temperature monitoring probe, in an embodiment.

DETAILED DESCRIPTION

A dual-sensor waterproof temperature monitoring probe may be used to continuously sense both a food temperature and a cooking environment temperature. The dual-sensor waterproof temperature monitoring probe measures temperature at two separate locations during cooking or heating of the food. The dual-sensor waterproof temperature monitoring probe has two temperature sensors: a food temperature sensor is positioned at a tip of the probe for sensing internal food temperature, and an ambient temperature sensor is positioned away from the tip to sense temperature of an ambient medium (e.g., air) in which the food is cooking. In certain embodiments, both the food temperature sensor and the ambient temperature sensor are disposed inside a single tube of the probe. In other embodiments, the ambient temperature sensor is disposed adjacent to a tube containing the food temperature sensor.

The term "waterproof" refers to the dual-sensor waterproof temperature monitoring probe passing standard IPX5 and/or IPX6 tests.

Figure 1:
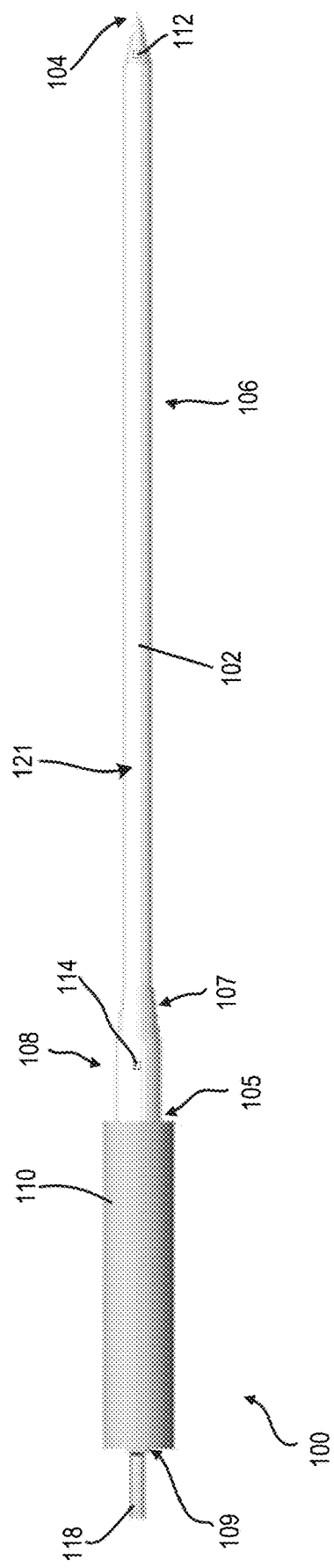
FIG. 1 depicts one example dual-sensor waterproof temperature monitoring probe, in an embodiment.
Figure 2:
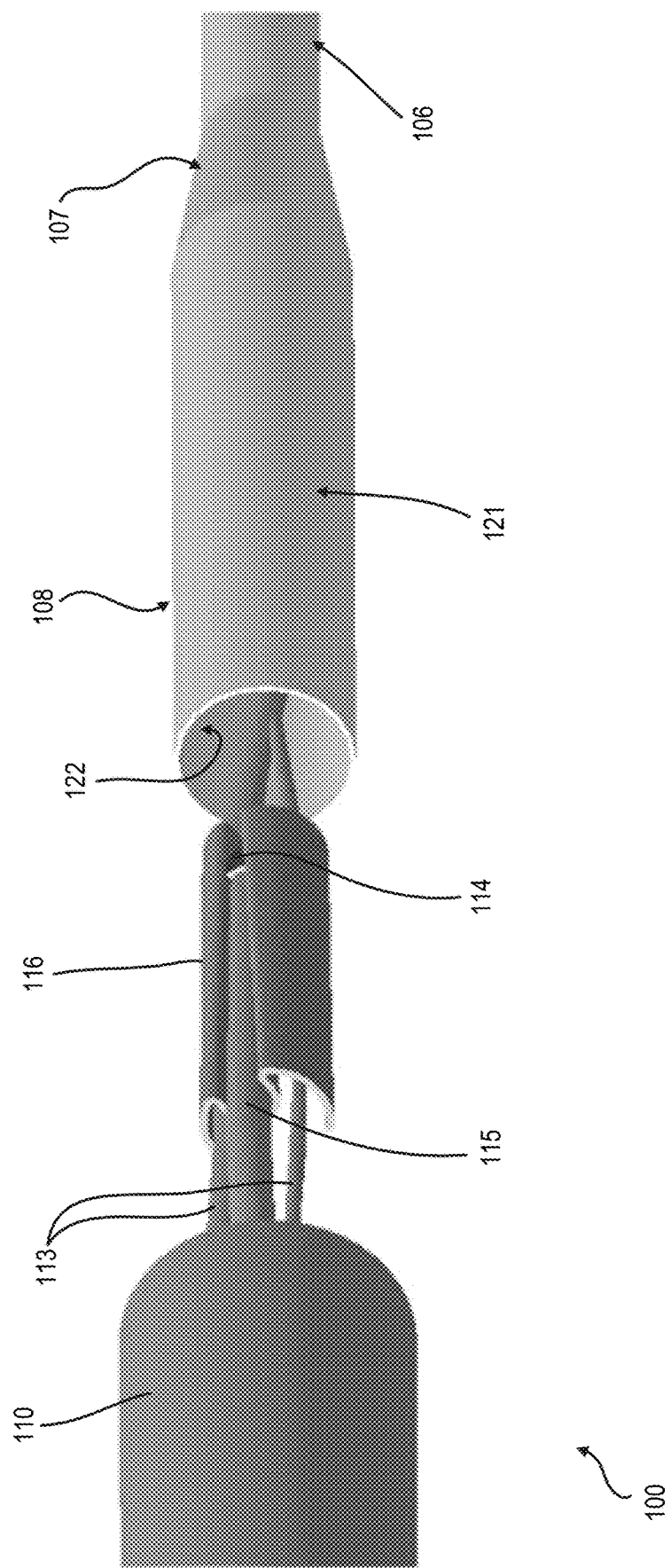
FIG. 2 shows internal components of the dual-sensor waterproof temperature monitoring probe of FIG. 1.
Figure 3:
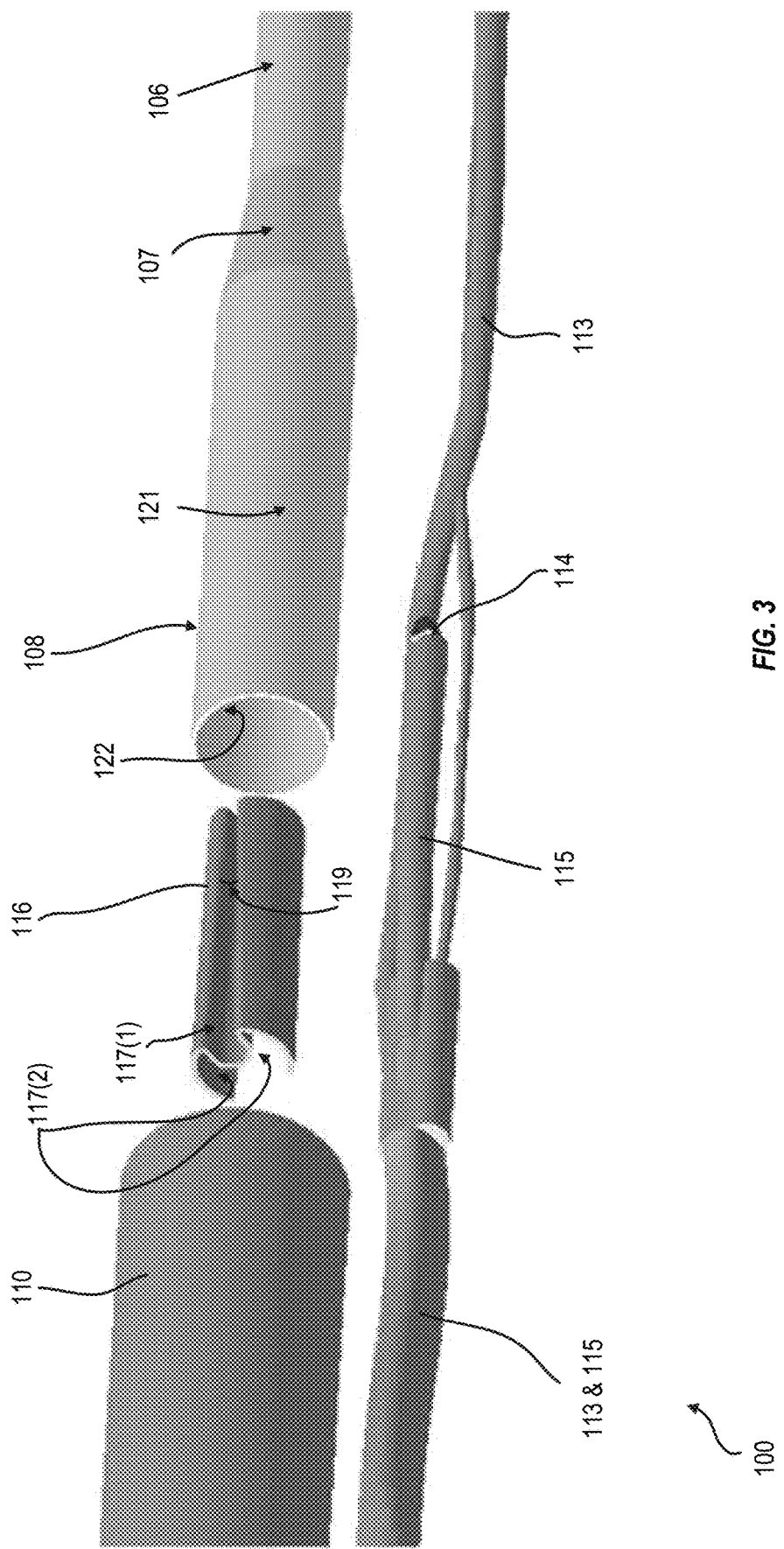
FIG. 3 is an expanded view of the internal components of the dual-sensor waterproof temperature monitoring probe of FIG. 1.
Figure 11:
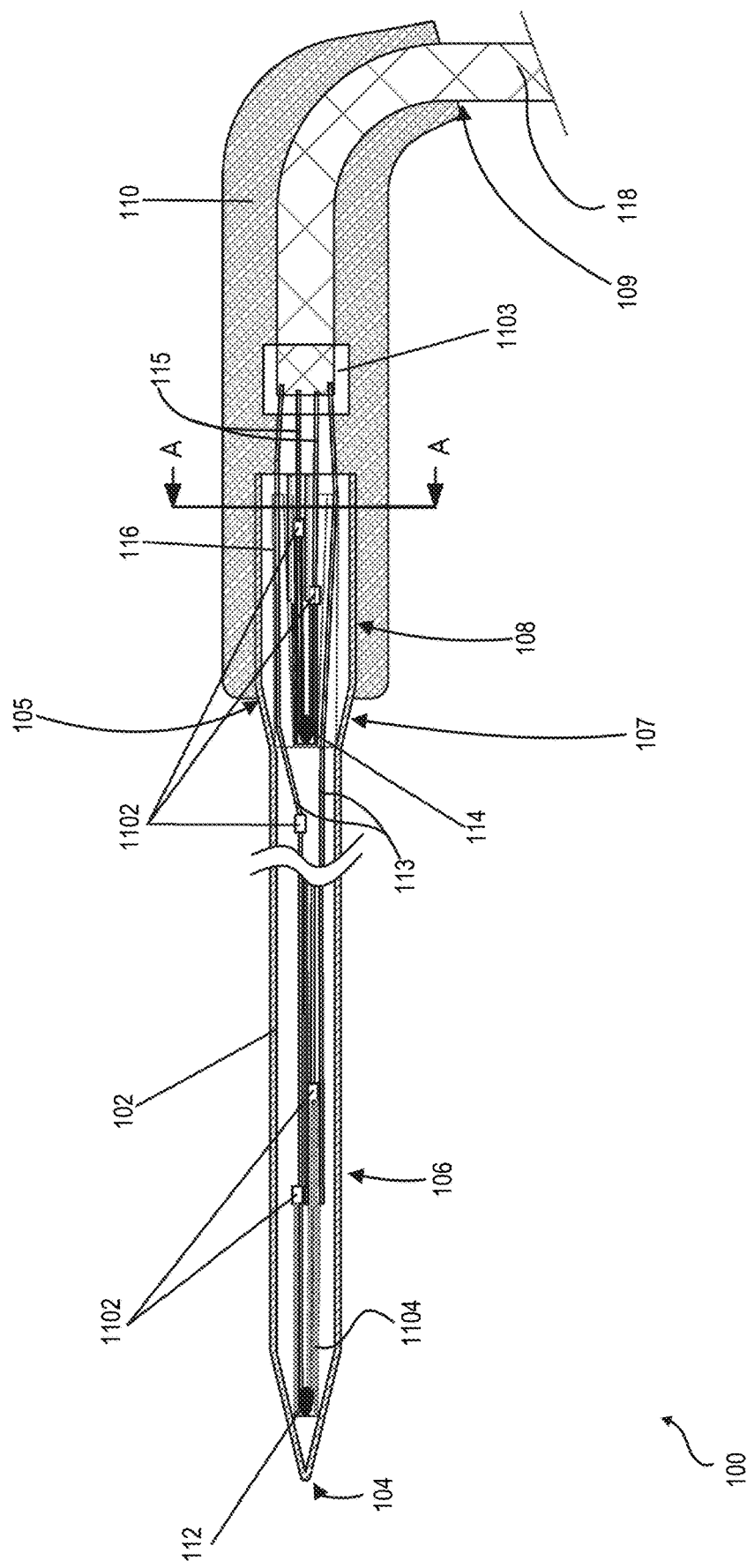
FIG. 11 is a partial cross-sectional view of an embodiment of the dual-sensor waterproof temperature monitoring probe of FIGS. 1-3.
Figure 12A:
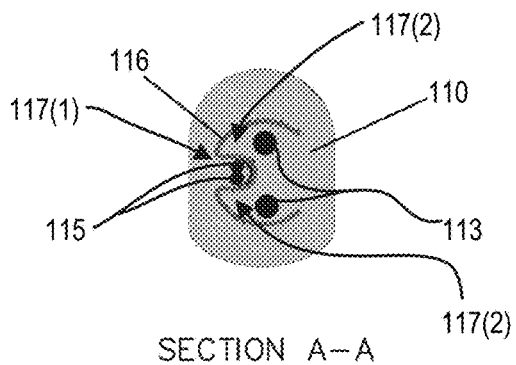
FIG. 12A is a cross-sectional view of the dual-sensor waterproof temperature monitoring probe of FIG. 11 along section line A-A.
Figure 12B:
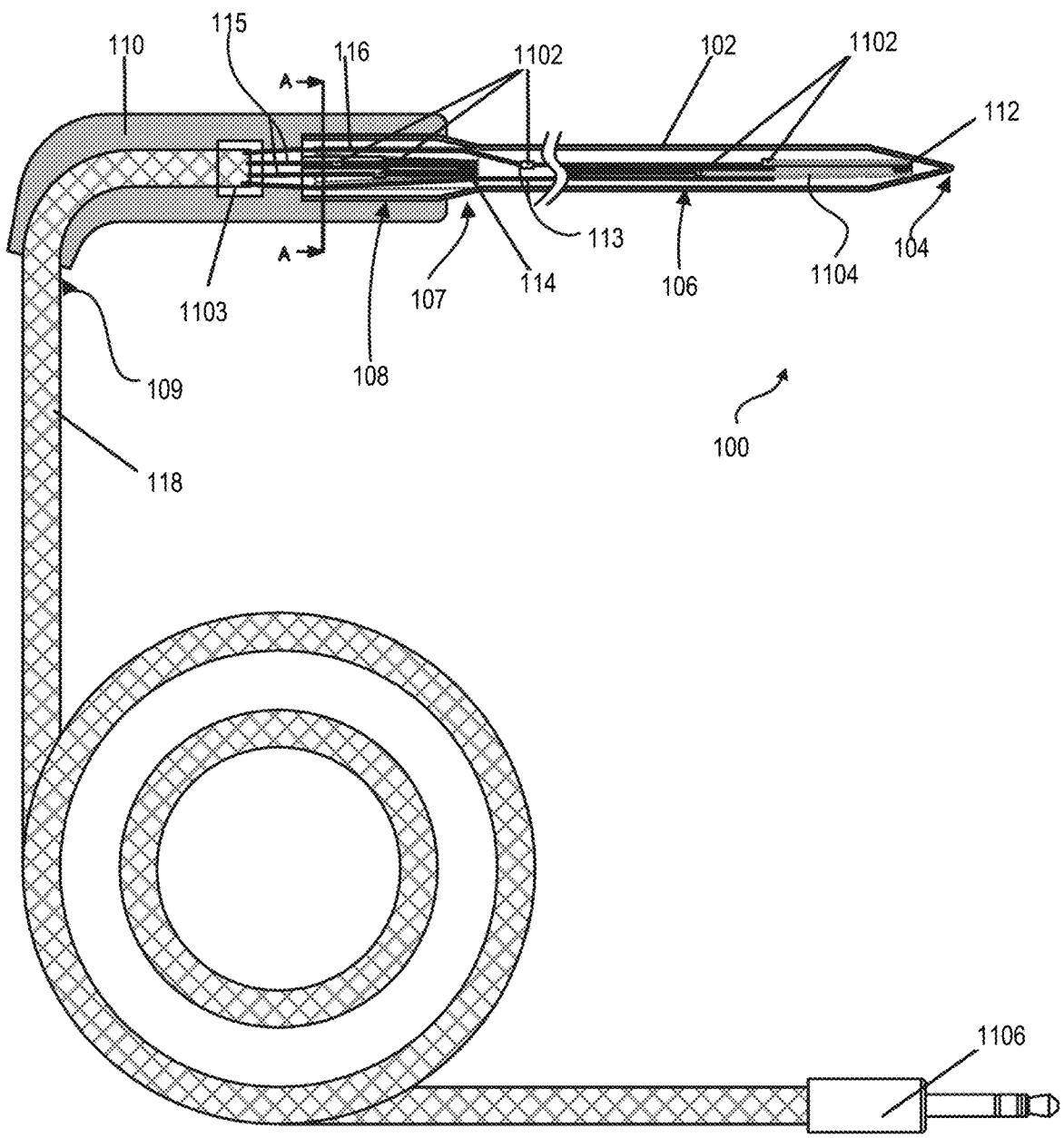
FIG. 12B is another partial cross-sectional view of the dual-sensor waterproof temperature monitoring probe of FIG. 11.

FIG. 1 depicts one example dual-sensor waterproof temperature monitoring probe 100. FIG. 2 shows internal components of dual-sensor waterproof temperature monitoring probe 100 of FIG. 1. FIG. 3 is an expanded view of the internal components of dual-sensor waterproof temperature monitoring probe 100 of FIG. 1. FIGS. 11, 12A, and 12B show partial cross-sectional views of an embodiment of probe 100. FIGS. 1-3, 11, and 12A-12B are best viewed together with the following description.

Dual-sensor waterproof temperature monitoring probe 100 is configured for in situ monitoring temperature of food during the cooking process. Probe 100 includes a hollow tube 102 having a first end 104 configured to penetrate food and having a first diameter 106, a second diameter 108 proximate a second end 105 of tube 102, and a transition 107 between first diameter 106 and second diameter 108. In certain embodiments, hollow tube 102 at first end 104 is closed or sealed. In an embodiment, first end 104 includes a pointed tip. Transition 107 between first diameter 106 and second diameter 108 may be a taper, or may be differently shaped, without departing from the scope hereof. For example, transition 107 may be linear, concave, or convex in form. In another embodiment, the transition between diameters 106 and 108 may be abrupt.

In one example of operation, a portion or all of hollow tube 102 at first diameter 106 is disposed within the food item and hollow tube 102 at second diameter 108 remains outside of the food item. Advantageously, transition 107 provides a stopping point during insertion of probe 100 into a food item to prevent probe 100 from being inserted too far into the food item.

Probe 100 includes a food temperature sensor 112 positioned within and at first end 104 of tube 102 and an ambient temperature sensor 114 positioned within tube 102 at second diameter 108. Probe 100 further includes wires 113 and wires 115. Wires 113 are electrically coupled to food temperature sensor 112 and wires 115 are electrically coupled to ambient temperature sensor 114. Wires 113 are electrically insulated or isolated from wires 115 and, in embodiments, tube 102 inside probe 100. In one embodiment, as illustrated in FIGS. 11 and 12B, sensor 112 is coupled to wires 113 and sensor 114 is coupled to wires 115 via copper clips or bump welds 1102. In one embodiment, hollow tube 102 is made from metal, such as stainless steel. In another embodiment, hollow tube 102 is made from high temperature resistant plastic. However, hollow tube 102 may be made from one or more other materials capable of retaining structural and chemical integrity at cooking temperatures (e.g., up to about 500 degrees Fahrenheit) without departing from the scope hereof. As used herein, structural and chemical integrity may be "retained" when the material does not disintegrate, or otherwise deform when exposed to a given temperature or composition (e.g. meat, water, etc.) An outer surface 121 of hollow tube 102 may have a non-stick coating (e.g., Teflon®) for ease of cleaning.

Wires 113 and 115 exit probe 100 at a back end 109, opposite of first end 104, of tube 102 as illustrated in FIG. 1. At back end 109, wires 113 and 115 are grouped together to form a cable 118. Wires 113 are electrically insulated or isolated from wires 115 within cable 118, which may include a braided wire shell. The braided wire shell may be completely sealed and formed of stainless steel to provide resistance to moisture and temperature. Metal (e.g., copper) clip 1103 may be used to couple wire 113 and 115 to cable 118 within handle 110.

In certain embodiments, probe 100 includes certain features of the food thermometer probe of U.S. patent application Ser. No. 14/133,266 to Chu, et al (hereinafter referred to as "Chu"), which is incorporated herein by reference. For example, present probe 100 may include a glass fiber tube (e.g., Chu item 112, FIG. 1) positioned within hollow tube 102 to thermally insulate wires 113 within hollow tube 102 from high temperatures. The glass fiber tube (e.g., Chu item 112, FIG. 1) may extend along at least part of hollow tube 102 between first end 104 and second end 105, but without surrounding temperature sensors 112 and 114.

In certain embodiments, probe 100 includes a first seal (e.g., Chu item 114, FIG. 1) and a second seal (e.g., Chu item 116, FIG. 1). The first seal is, for example, a Teflon® heat-shrink tube surrounding at least part of the glass fiber tube (e.g., Chu item 112, FIG. 1). In this embodiment, the first seal fills a space between an inner surface 122 of hollow tube 102 and an outer surface of the glass fiber tube to prevent ingress of moisture. The first seal may extend along a portion of hollow tube 102 of probe 100. The second seal is, for example, a Teflon® heat-shrink tube surrounding at least a portion of wires 113 and 115 and hollow tube 102 proximate to second end 105. The second seal may surround wires 113 and/or 115 (FIG. 11) within hollow tube 102. Second seal provides a moisture barrier to prevent moisture from entering between wires 113 and 115 and hollow tube 102. The second seal may also provide thermal protection for respective wires 113 and/or 115 during probe operation and/or during manufacture of the probe (e.g., during high temperature mold injection).

Probe 100 may further include a third seal 1104 within hollow tube 102 and at first end 104 to provide additional electrical insulation between wires 113 and hollow tube 102. Third seal 1104 may further provide additional thermal insulation to protect wires 113. Third seal 1104 may be, for example, a Teflon® heat-shrink tube. Third seal 1104 may include more than one seal (e.g., more than one Teflon® heat-shrink tube).

Probe 100 further includes an ambient temperature sensor holder 116, as seen in FIGS. 2-3, for example. Holder 116 is specially designed for tight fitting inside second diameter 108. Ambient sensor 114 is fit within a central groove 117(1) of ambient temperature sensor holder 116, as shown in FIGS. 2-3. Holder 116 is designed to position ambient temperature 114 adjacent inner surface 122 of hollow tube 102. Central groove 117(1) may be a fold. In another embodiment, central groove 117(1) may be a groove formed as a result of cutting or etching a groove. In certain embodiments, central groove 117(1) is straight. In other embodiments, central groove 117(1) has an internal angle 119, such as illustrated in FIG. 3, designed to fit temperature sensor 114 tightly within. Ambient sensor 114 may be further secured in holder 116 with an adhesive. A thermal coupling (e.g., a thermally conductive material, such as a paste, not restricted to an adhesive) may be used to thermally connect ambient sensor 114 with hollow tube 102 at second diameter 108, for improved sensitivity of ambient temperature sensor 114 to ambient temperatures. In an example, the thermal coupling is Permatex® HI-Temp Red RTV Silicone Gasket, which is resistant to temperatures up to 650 Fahrenheit. Optionally, holder 116 may include additional grooves, or folds, such as 117(2), as shown in FIGS. 3 and 12A, for example. Wires 113 may fit through grooves 117(2), as illustrated in FIG. 2. A cross-sectional view of an embodiment of holder 116 is illustrated in FIG. 12A. In an embodiment, holder 116 may be formed of an electrically insulating material, such as a polymer. In an alternative embodiment, holder 116 is made of an electrically conductive material, such as a metal, and, in embodiments, the surface of holder 116 may be coated with an electrically insulating material.

Probe 100 further includes a handle 110, which surrounds second diameter 108 and wires 113 and 115 between second 105 and back end 109. In an embodiment, handle 110 may envelope tube 102 at second diameter 108, as illustrated in FIGS. 11 and 12B, for example. Handle 110 provides a permanent waterproof seal, preventing moisture from entering inside probe 100, such that probe 100 is waterproof. Therefore, probe 100 may be washed manually, soaked in water, or washed in an automatic dishwasher. Handle 110 may provide thermal insulation. Handle 110 may be formed of a high temperature resistant injected plastic. For example, handle 110 is formed of 20% glass-filled polyether ether ketone (PEEK), having a thermal conductivity of 0.29 $Wm^{-1}K^{-1}$. In certain embodiments, handle 110 is formed by methods taught by Chu. Handle 110 retains structural and chemical integrity at cooking temperatures (for example, up to at least 500 degrees Fahrenheit).

Probe 100 may further include a securing structure (e.g., Chu item 144, FIG. 1) to prevent handle 110 from separating from probe 100 during cooking and washing. The securing structure is for example one or more protrusions that extend radially from tube 102 that are retained by handle 110. The securing structure may be formed by methods taught by Chu. Probe 100 may use other forms of the securing structure such as Chu item 842 (Chu FIG. 8), Chu items 942-945 (Chu FIG. 9), and Chu items 1042-1045 (Chu FIG. 10).

Figure 4:
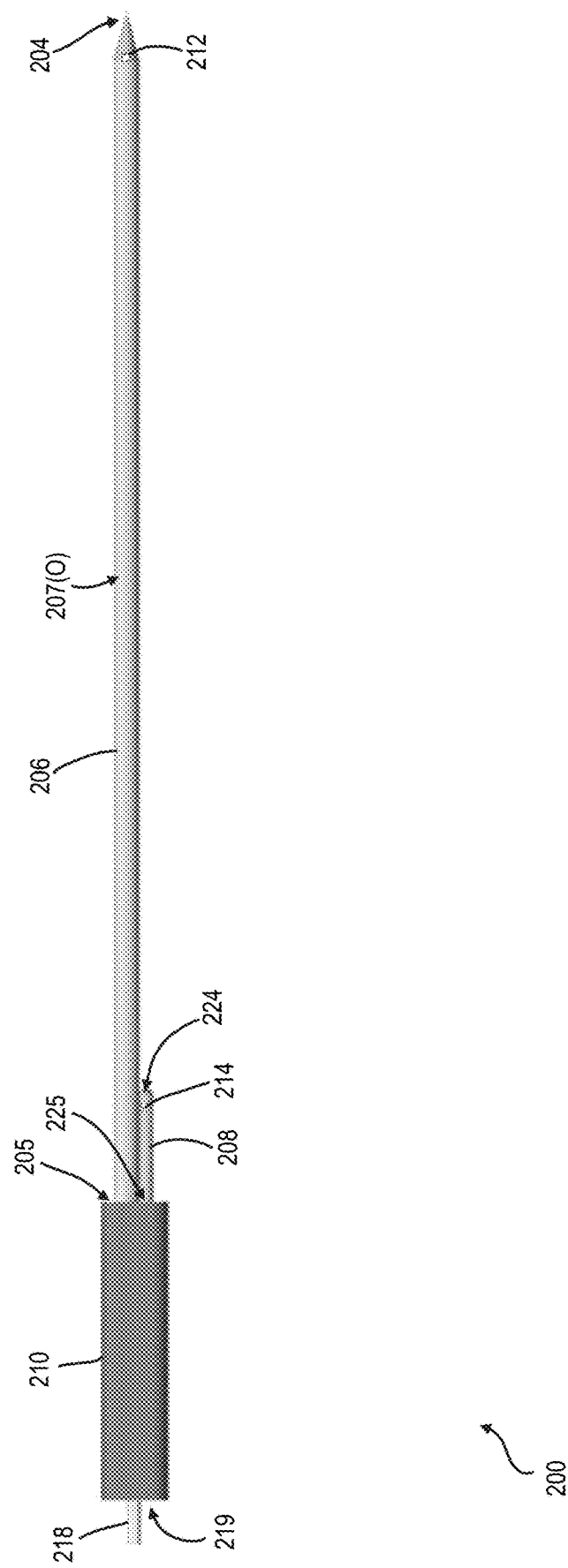
FIG. 4 depicts an example dual-sensor waterproof temperature monitoring probe with an auxiliary hollow tube, in another embodiment.
Figure 5:
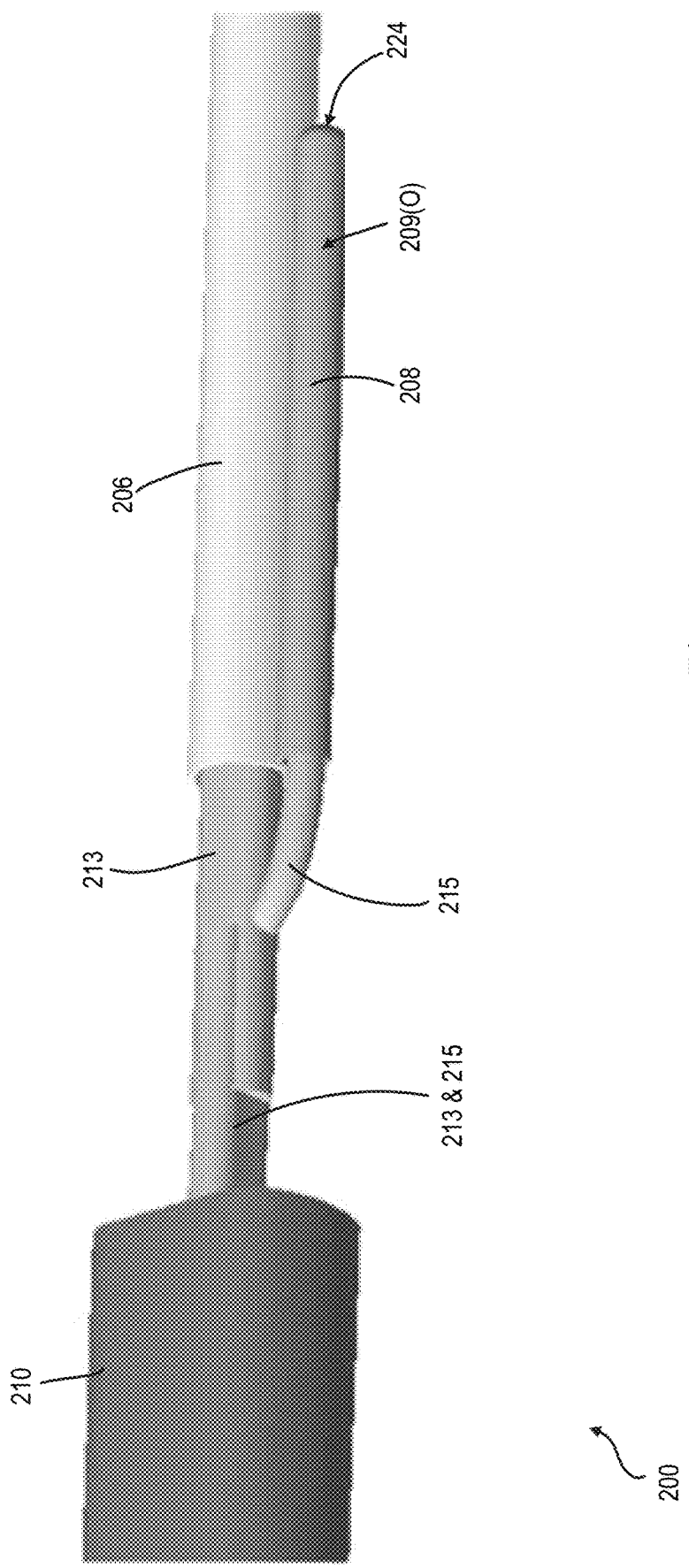
FIG. 5 shows the dual-sensor waterproof temperature monitoring probe of FIG. 4 with a molding retracted to show internal connectivity, in an embodiment.
Figure 6:
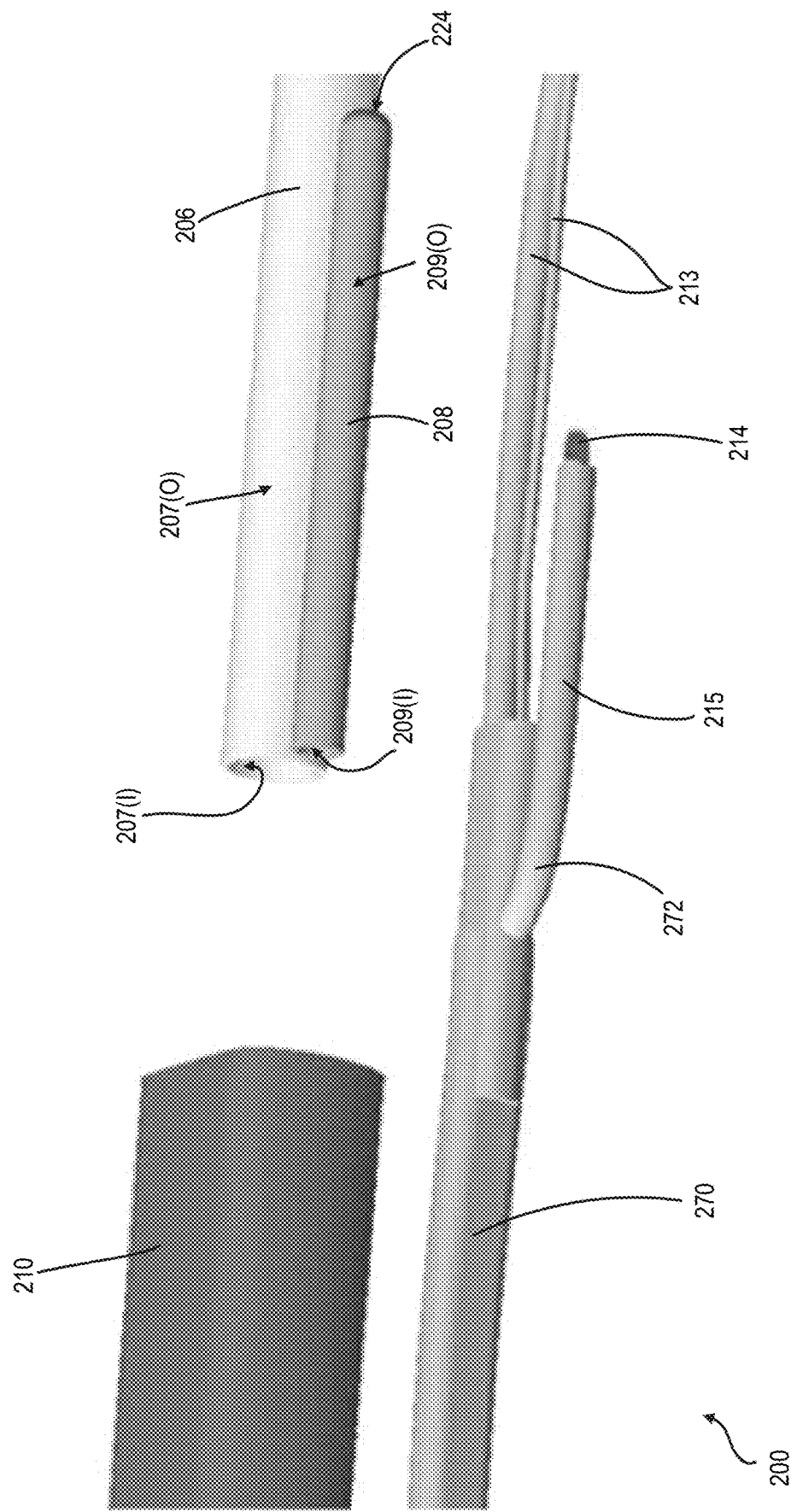
FIG. 6 shows example internal components of the dual-sensor waterproof temperature monitoring probe of FIG. 4.
Figure 13:
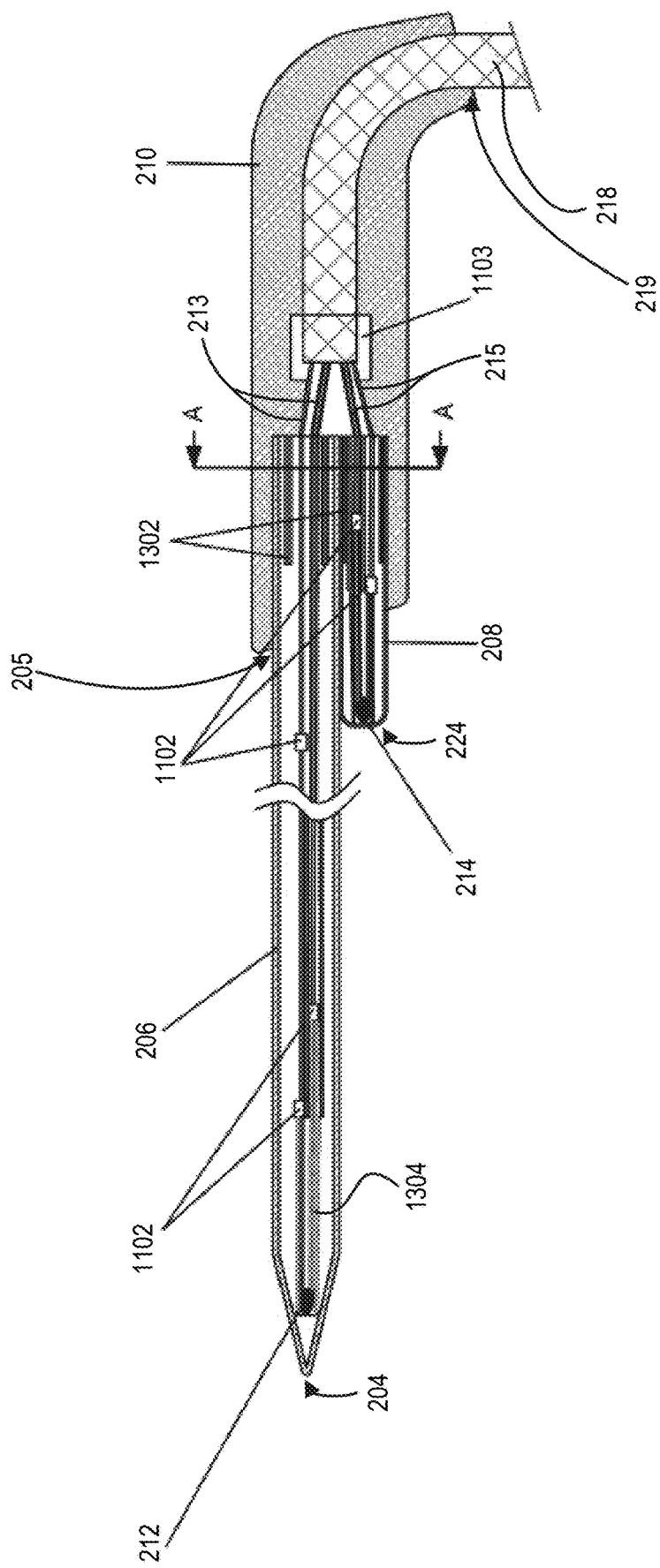
FIG. 13 is a partial cross-sectional view of an embodiment of the dual-sensor waterproof temperature monitoring probe of FIGS. 4-6.
Figure 14A:
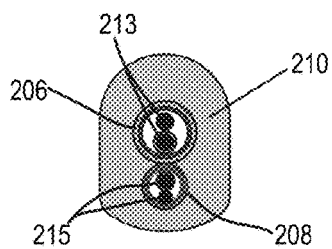
FIG. 14A is a cross-sectional view of the dual-sensor waterproof temperature monitoring probe of FIG. 13 along section line A-A.
Figure 14B:
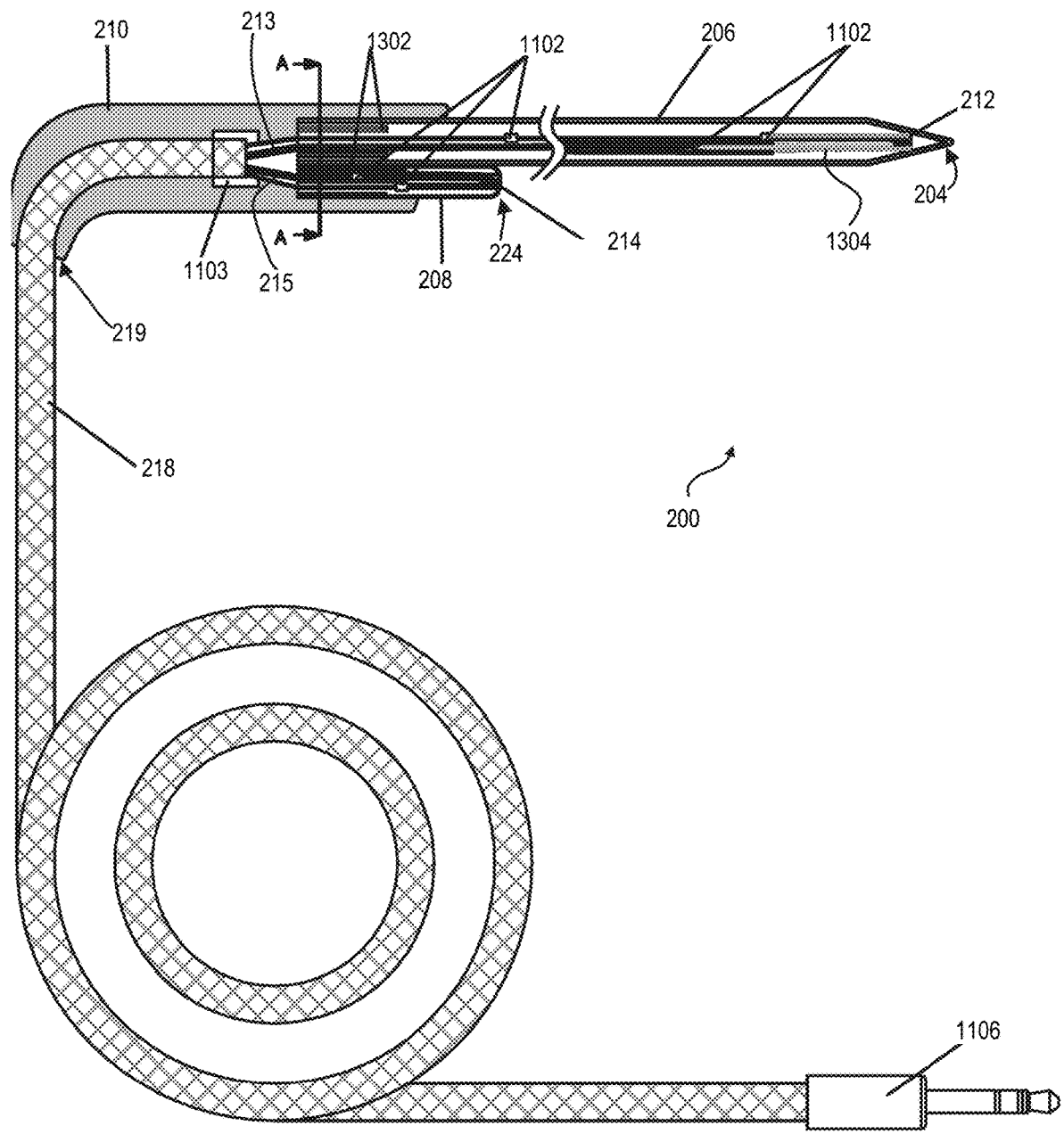
FIG. 14B is another partial cross-sectional view of the dual-sensor waterproof temperature monitoring probe of FIG. 13.

FIG. 4 depicts a dual-sensor waterproof temperature monitoring probe 200 with an auxiliary hollow tube. FIG. 5 shows the dual-sensor waterproof temperature monitoring probe of FIG. 4 with a molding retracted to show internal connectivity, in an embodiment. FIG. 6 shows example internal components of the dual-sensor waterproof temperature monitoring probe of FIG. 4. FIGS. 13, 14A, and 14B show partial cross-sectional views of an embodiment of probe 200. FIGS. 4-6, 13, 14A, and 14B are best viewed together with the following description.

Dual-sensor waterproof temperature monitoring probe 200 is configured for in situ monitoring temperature of food during the cooking process. Probe 200 includes a primary hollow tube 206, with a first end 204, an auxiliary hollow tube 208, with first end 224. Primary and secondary hollow tubes 206 and 208 have second ends 205 and 225, respectively. In an embodiment, second ends 205 and 225 are flush with each other. In certain embodiments, hollow tubes 206 and 208 at first ends 204 and 224, respectfully, are closed or sealed. In an embodiment, first end 204 includes a pointed tip. Tubes 206 and 208 are parallel to each other. Tube 208 may be shorter in length than tube 206. Tube 208 may have a smaller diameter than tube 206. Hollow tubes 206 and 208 are attached to each other, for example by an adhesive or a welded joint. A food temperature sensor 212 is positioned within primary hollow tube 206 at first end 204 and an ambient temperature sensor 214 is positioned within auxiliary hollow tube 208 at first end 204. Probe 200 further includes wires 213 and wires 215. Wires 213 are electrically coupled to food temperature sensor 212 and wires 215 are electrically coupled to ambient temperature sensor 214, as illustrated in FIGS. 2 and 3. Wires 113 are electrically insulated or isolated from wires 115 inside probe 200. For example, in an embodiment, the wires 213 may extend into a first support structure 270, and the wires 215 may extend into a second support structure 272 that is attached (e.g., adhered or welded) to the first support structure 270. The wires 215 may further extend into the first support structure 270 after passing through the second support structure 272. A portion of one or both of the first support structure 270 and the second support structure 272 may extend into (or be surrounded by) the first tube 206 and the second tube 208, respectively. In one embodiment, as illustrated in FIGS. 13 and 14B, sensor 212 is coupled to wires 213 and positioned away from the end of the first support structure 270, and sensor 214 is coupled to wires 215 via copper clips or bump welds 1102 and positioned proximate the end of the second support structure 272, as shown in FIG. 6.

In one example of operation, a portion or all of tube 206 is disposed within a food item and tube 208 remains outside of the food item.

In one embodiment, one or both of primary and auxiliary hollow tubes 206 and 208, respectively, are made from metal such as stainless steel. In another embodiment, one or both of tubes 206 and 208 are made from high temperature resistant plastic. However, tubes 206 and 208 may be made from one or more other materials capable of substantially retaining structural and chemical integrity at cooking temperatures (e.g., at least 500 degrees Fahrenheit) without departing from the scope hereof. Each of outer surfaces 207(O) and 209(O) of hollow tubes 206 and 208, respectively, may have a non-stick coating (e.g., Teflon®), for ease of cleaning.

Wires 213 and 215 exit probe 200 at a back end 219 of probe 200, opposite of first end 204, of tube 206, as illustrated in FIG. 1. At back end 209, wires 213 and 215 are grouped together to form a cable 218. Wires 213 are electrically insulated or isolated from wires 215 within cable 218, which may include a braided wire shell, similar to cable 118 of probe 100.

Probe 200 further includes a handle 210 which surrounds a portion of each of hollow tubes 206 and 208 as well as wires 213 and 215 between second ends 205 and 225 and back end 219. Features, properties, function, and method of manufacture of handle 210 are common with embodiments of handle 110, such providing a permanent waterproof seal that prevents moisture from entering inside probe 200, including the inside of each of tubes 206 and 208. Probe 200 may thereby be washed manually, soaked in water, or washed in an automatic dishwasher.

In certain embodiments, probe 200 includes features common to corresponding embodiments of probe 200 such as a glass fiber tube, a first seal, a second seal, and/or a securing structure. For example, probe 200 may include a glass fiber tube disposed within one or both of primary hollow tube 206 auxiliary hollow tube 208. For example, probe 200 may include a first seal surrounding at least a part of each of the one or more glass fiber tubes. In an embodiment, probe 200 may include a second seal (e.g., seal 1302, FIG. 13) surrounding portions of one or both of wires 213 and 215 within respective tube 206 or 208 where handle 210 surrounds respective tube 206 or 208. The second seal may surround portions of respective hollow tube 206 and/or 208 to provide moisture protection, for example. Second seal 1302 provides thermal protection for respective wires 213 and/or 215 during probe operation and/or during manufacture of the probe (e.g., during high temperature mold injection). In another embodiment, probe 200 may include a securing structure that prevents handle 210 from separating from tubes 206 and 208. Probe 200 may further include a third seal 1304, which is similar to third seal 1104, within hollow tube 206 and at first end 204 to provide additional electrical insulation between wires 213 and hollow tube 206.

Other embodiments of the dual-sensor waterproof temperature monitoring probes featured herein may have any combination of features of probe 100 and probe 200.

Figure 7:
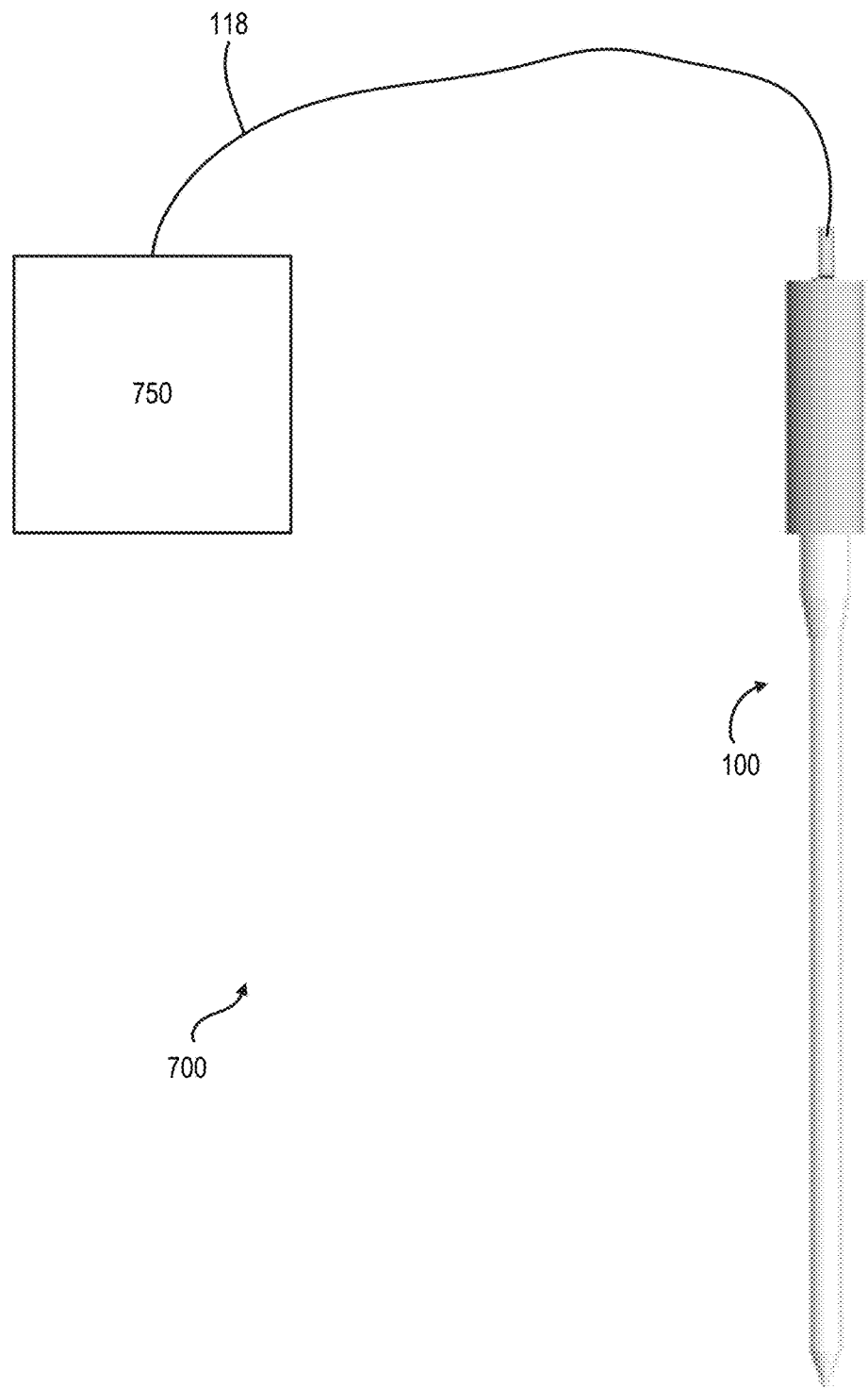
FIG. 7 illustrates one example dual-sensor waterproof temperature monitoring system, in an embodiment, for sensing temperature of food and temperature of a cooking environment using the dual-sensor waterproof temperature monitoring probe of FIG. 1.

FIG. 7 illustrates dual-sensor waterproof temperature monitoring probe system 700, which is one example embodiment of the dual-sensor waterproof temperature monitoring probe systems featured herein. System 700 includes any embodiment of the dual-sensor waterproof temperature monitoring probes featured herein. For example, FIG. 7 illustrates system 700 having probe 100. Purely for simplicity, discussion of system 700 hereinafter includes features of probe 100, such as cable 118, but system 700 may include features of probe 200, for example. Certain embodiments of system 700 include certain features of the dual thermometer system of U.S. Pat. No. 7,128,466 to Chang, et al (hereinafter referred to as "Chang"), which is incorporated herein by reference. System 700 includes a display/control unit 750. Display unit 750 may be an electronic display for displaying the temperature read from the food and ambient temperature sensors (e.g., sensors 112 and 114 of probe 100). Display unit 750 may have features common with embodiments of the LCD module in Chang (Chang item 16). In one embodiment, display unit 750 is a mobile display such as a computer, a tablet, smartphone or other mobile electronic device that communicates with probe 100 via cable 118.

System 700 includes a plug (e.g., 1106 or Chu item 124) at an end of cable 118 opposite of probe 100. Cable 118, in system 700, may be any length suitable for use of the dual-sensor waterproof temperature monitoring probe. The plug is electrically coupled to wires 113 and 115. Wires 113 are electrically insulated or isolated from wires 115 within the plug. The plug provides electrical coupling of wires 113 and 115 to display unit 750.

Figure 8:
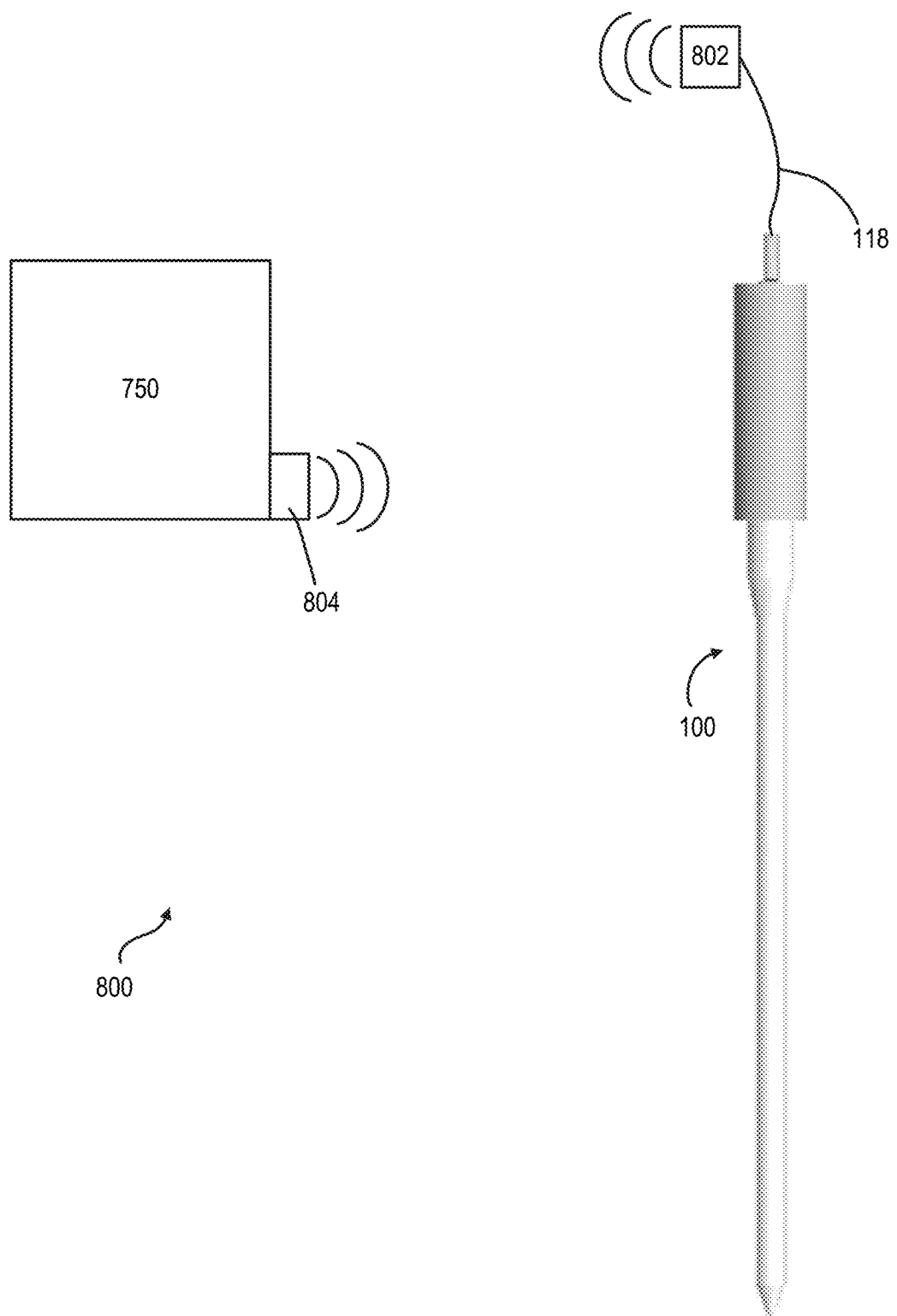
FIG. 8 illustrates another example dual-sensor waterproof temperature monitoring system, in an embodiment, for sensing temperature of food and temperature of a cooking environment using the dual-sensor waterproof temperature monitoring probe of FIG. 1.

FIG. 8 illustrates dual-sensor waterproof temperature monitoring probe system 800, which is one example embodiment of the dual-sensor waterproof temperature monitoring probe systems featured herein. System 800 includes any embodiment of the dual-sensor waterproof temperature monitoring probes featured herein. For example, FIG. 8 illustrate system 800 having probe 100. Purely for simplicity, discussion of system 800 hereinafter includes features of probe 100, such as cable 118, but system 800 may include features of probe 200, for example. Certain embodiments of system 800 include certain features of the dual thermometer system of Chang. System 800 includes display/control unit 750, having certain features in common display unit 750 in system 700.

System 800 includes a wireless transceiver 802 at an end cable 118, opposite of probe 100. Cable 118, in system 800, may be any length suitable for use of the dual-sensor waterproof temperature monitoring probe. Wireless transceiver 802 is electrically coupled to wires 113 and 115. Wireless transceiver 802 communicates with a wireless signal receiver 804, which may be integrated with display unit 750 and is electrically coupled to display unit 750.

Figure 9:
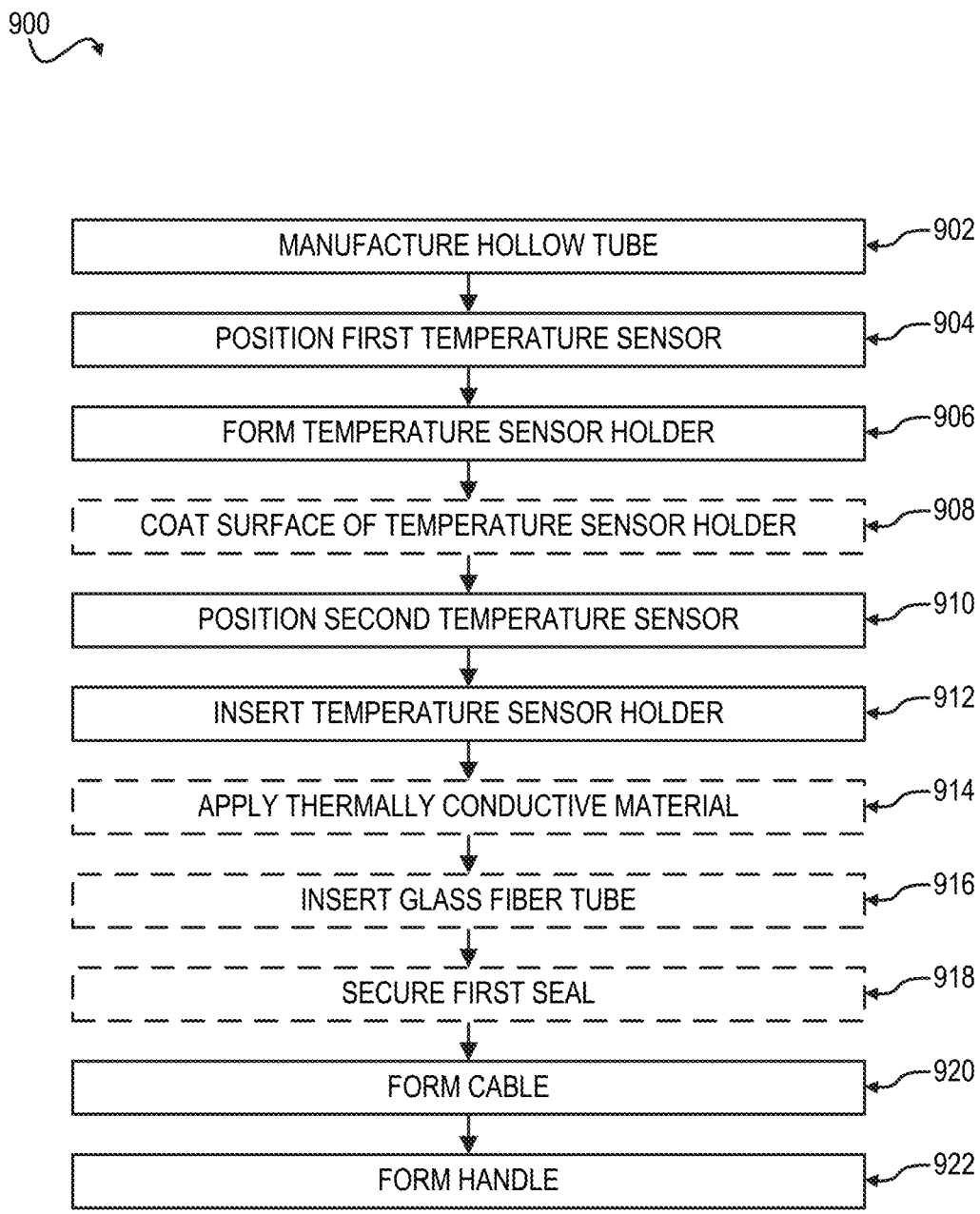
FIG. 9 is a flowchart illustrating one example method for manufacture of the dual-sensor waterproof temperature monitoring probe of FIG. 1, in an embodiment.

FIG. 9 is a flowchart illustrating one example method 900 for manufacture of dual-sensor waterproof temperature monitoring probe 100 of FIG. 1, including a temperature sensor holder 116. Dashed lines within FIG. 9 represent optional steps.

In step 902, method 900 manufactures a hollow tube of a dual-sensor waterproof temperature monitoring probe having a first diameter, a second diameter, and a transition therebetween. For example, in step 902, method 900 manufactures hollow tube 102, of probe 100, with first diameter 106, second diameter 108, and transition 107. In an embodiment of step 902, hollow tube 102 is manufactured with a sealed/closed first end and an open second end. In an embodiment, in step 902, method 900 further manufactures a securing structure (e.g., Chu item 144, Chu item 842, Chu items 942-945, or Chu items 1042-1045). In step 902, method 900 may manufacture hollow tube 102 using a sheet of metal such as stainless steel that is rolled, welded, cut and/or polished into the desired shape and size.

In step 904, method 900 positions a food temperature sensor, and corresponding electrically coupled wires, within the hollow tube of step 902. For example, in step 904, method 900 positions food sensor 112 at first end 104 within first diameter 106 of hollow tube 102, with wires 113 running between temperature sensor 112 at first end 104 and second end 105. In one embodiment of step 904, sensor 112 is freely secured within hollow tube 102. In another embodiment of step 904, a thermal coupling (e.g., a thermally conducting paste) may be used between sensor 112 and hollow tube 102 at first end 104.

In step 906, method 900 forms temperature sensor holder 116. In one example of step 906, the temperature sensor holder is formed of an electrically insulating material, such as a polymer and shaped to (a) tightly fit into tube 102 of temperature probe 100, to (b) fit temperature sensor 114, to (c) press temperature sensor 114 against inside surface 122 of hollow tube 102. In an example of step 906, method 900 shapes temperature sensor holder as depicted in FIGS. 2-3. In another example of step 906, the temperature sensor holder is formed of a metallic material. The shape of the temperature sensor holder includes central groove or fold 117(1), within which a temperature sensor is fitted in a later step. In certain embodiments, groove 117(1) is manufactured with an internal angle (e.g., 119), designed to fit temperature sensor 114 tightly within. In other embodiments, central groove 117(1) is straight. In an example of step 906, the temperature sensor holder of method 900 may be further shaped to include additional grooves 117(2) or folds to fit additional wires 113, for example, and optionally isolate the additional wires from temperature sensor 114. In another example of step 906, temperature sensor holder 116 is manufactured using injection molding. In another example of step 906, temperature sensor holder 116 is formed by applying pressure and/or heat to a differently-shaped or flat object. In another example of step 906, the central groove of temperature sensor holder 116 is formed by cutting or etching.

Step 908 is optional. If included, in step 908, method 900 coats an external surface of temperature sensor holder 116 with an electrically insulating material. In certain embodiments, the coating is deposited by spray coating, curtain coating, or chemical vapor deposition.

In step 910, method 900 positions a temperature sensor (114) within central groove 117(1) of temperature sensor holder 116 such that temperature sensor 114 is tightly fitted in central groove, or fold, 117(1), such as depicted in FIG. 2, for example. In an embodiment of step 910, wires 115, which are electrically coupled to temperature sensor 114, also fit through a portion of central groove 117(1). In another embodiment of step 910, method 900 includes using an adhesive to secure temperature sensor 114 within central groove 117(1) of the temperature sensor holder with an adhesive. In another example of step 910, other wires 113 are fit through additional grooves (e.g., 117(2)) of temperature sensor holder 116.

In step 912, method 900 inserts the temperature sensor holder, and the temperature sensor secured therein, of steps 906-910 into the hollow tube of step 902. In an example of step 912, method 900 inserts temperature sensor holder 116 into hollow tube 102 at second diameter 108. In an embodiment of step 912, temperature sensor holder 116 is positioned such that temperature sensor 114 is in thermal contact with inside surface 122 hollow tube 102 of temperature probe 100.

Step 914 is optional. If included, in step 914, method 900 applies a thermally conductive material such as a paste, not restricted to an adhesive, between temperature sensor holder 116 and temperature sensor 114 and/or between temperature sensor 114 and inside surface 122 of hollow tube 102 to improve thermal coupling.

Step 916 is optional. If included, in step 916, method 900 inserts and secures a glass fiber tube (e.g., Chu item 112) within the hollow tube manufactured in step 902. Wires 113 may run through the glass fiber tube between first end 104 and second end 105. The glass fiber tube may be retained within hollow tube 120 via crimping of second end 105 of hollow tube 120 such that pressure applied at second end 105 seals the first seal, of step 918, thereby permanently affixing the glass fiber tube.

Step 918 is optional. In step 918, method 900 secures a first seal (e.g., Chu item 114) within the hollow tube of step 902. For example, first seal is a heat-shrink tube that is heat shrunk to the glass fiber tube between the glass fiber tube and hollow tube 100.

In step 920, method 900 groups wires 113 and 115 to form a cable (e.g., 118). In an embodiment of step 920, cable 118 includes a braided wire shell. Wires 113 are electrically insulated or isolated from wires 115 within cable 118. In an embodiment, wires 113 and 115 may be grouped to form cable 118 at second end 105 of probe 100. In another embodiment of step 920, wires 113 and 115 may be grouped to form cable 118 at back end 109 of probe 100. In an embodiment of step 920, a plug and/or transceiver (e.g., 802) is electrically coupled to wires 113 and 115, within cable 118.

In step 922, a handle is molded around a portion of probe 100. In an embodiment of step 922, handle 110 is formed around a portion of wires 113 and 115 (e.g., cable 118) and a portion of hollow tube 102. In another embodiment, handle 110 is formed around the securing structure of step 902 such that handle 110 will not release from probe 100. In an embodiment, handle 110 is made from high temperature resistant plastic. In step 922, after it is formed, handle 110 provides a waterproof seal, preventing moisture from entering inside probe 100, such that probe 100 is waterproof. Furthermore, in step 922, handle 110 retains structural and chemical integrity at cooking temperatures (for example, up to at least 500 degrees Fahrenheit).

It will be appreciated that steps 902-922 are not limited in scope to the order as illustrated in FIG. 9. Any combination of the above steps may be performed in parallel.

Figure 10:
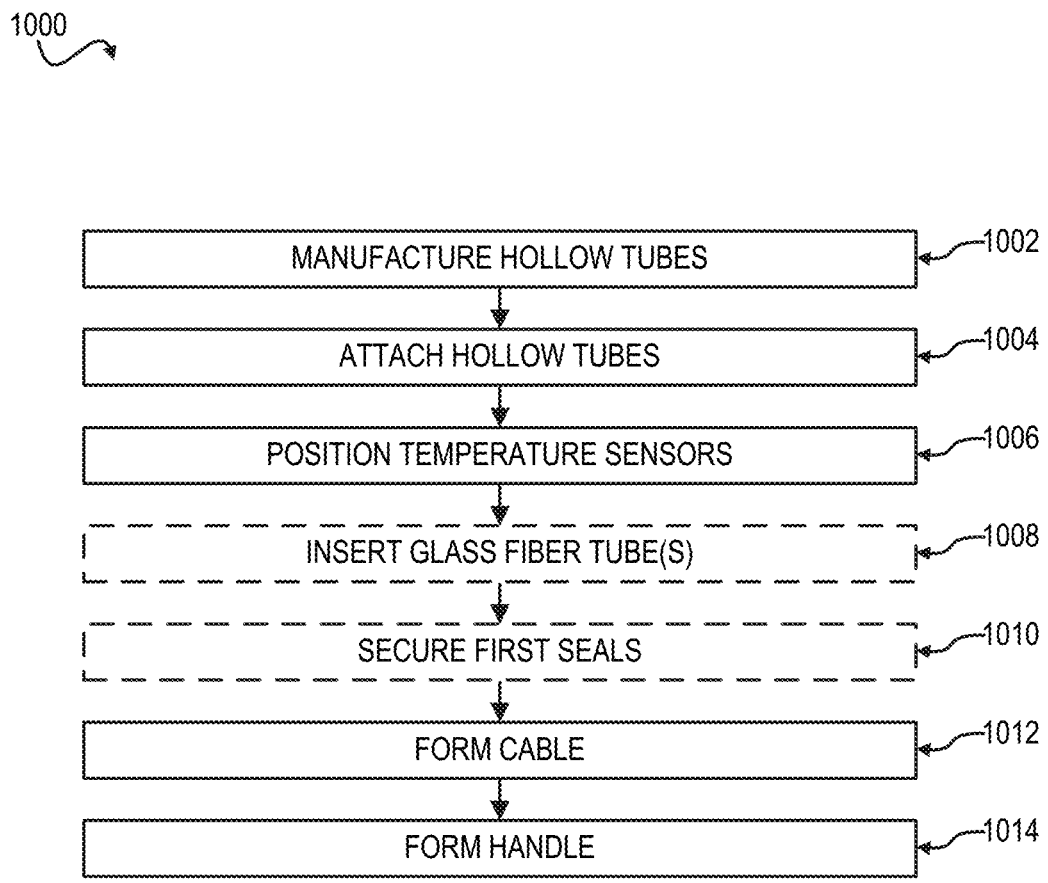
FIG. 10 is a flowchart illustrating one example method for manufacture of the dual-sensor waterproof temperature monitoring probe of FIG. 4, in an embodiment.

FIG. 10 is a flowchart illustrating one example method 1000 for manufacture of dual-sensor waterproof temperature monitoring probe 200 of FIG. 4.

In step 1002, method 1000 manufactures primary and auxiliary hollow tubes 206 and 208, respectfully, of probe 200. In step 1002, hollow tubes 206 and 208 are manufactured with first open ends 204 and 224, respectfully, and second closed ends, 205 and 225, respectfully. In one embodiment of step 1002, method 1002 further manufactures a securing structure (e.g., Chu item 144, Chu item 842, Chu items 942-945, or Chu items 1042-1045). In step 1002, method 1000 may manufacture each of hollow tubes 206 and 208 using a sheet of metal such as stainless steel that are rolled, welded, cut and/or polished into the desired shape and size.

In step 1004, method 1000 attaches hollow tube 206 and hollow tube 208 to each other. In one embodiment of step 1004, hollow tubes 206 and 208 are attached via an adhesive. In another embodiment of step 1004, hollow tubes 206 and 208 are attached via welding.

In step 1006, method 1000 positions food and ambient temperature sensors 212 and 214 within hollow tubes 206 and 208, of step 1002, at first ends 204 and 224, respectively. In one embodiment of step 1006, wires 213 are electrically coupled to sensor 212 and wires 215 are electrically coupled to sensor 214 before sensors 212 and 214 are inserted into tubes 206 and 208, respectively. In another embodiment of step 1006, wires 213 are electrically coupled to sensor 212 and wires 215 are electrically coupled to sensor 214 after sensors 212 and 214 are positioned within hollow tubes 206 and 208, respectively. In an embodiment of step 1006, food temperature sensor 212 is freely secured within primary hollow tube 206. In this embodiment, sensor 212 and respective connecting wires 213 may be guided within primary hollow tube 206 until sensor 212 reaches first end 204. In another embodiment, ambient temperature sensor 214 is freely secured within auxiliary hollow tube 208 at first end 224. In this embodiment, sensor 214 and respective connecting wires 215 are guided within auxiliary hollow tube 208 until sensor 214 reaches first end 224. In another embodiment of step 1006, a thermal coupling (e.g., a thermally conducting paste) may be used between food temperature sensor 212 and hollow tube 206 at end 204. In another embodiment of step 1006, a thermal coupling may be used between ambient temperature sensor 214 and hollow tube 208 at end 224.

Step 1008 is optional. In step 1008, if included, method 1000 inserts a glass fiber tube (e.g., Chu item 112) within one of or each of both the hollow tubes manufactured in step 1002. In certain embodiments of step 1008, wires 213 or 215 run through each glass fiber tube between first end 204 or 224, respectively, and second end 205 or 225, respectively. Each glass fiber tube may be retained within its respective hollow tube (primary or auxiliary hollow tube 206 or 208) via crimping of respective second end 205 or 225, such that pressure applied at second end 205 or 225 seals the primary and auxiliary first seals, of step 1010, thereby permanently affixing the respective glass fiber tube.

Step 1010 is optional. In step 1010, if included, method 1000 secures primary and auxiliary first seals (e.g., Chu item 114) within primary and auxiliary hollow tubes 206 and 208, of step 1002, respectively. In an example of step 1010, each of primary and auxiliary first seals is a heat-shrink tube that is heat shrunk to the respective glass fiber tube between the glass fiber tube and respective primary or auxiliary hollow tube 206 or 208.

In step 1012, method 1000 groups wires 213 and 215 to form a cable (e.g., 218). In an embodiment of step 1012, cable 218 includes a braided wire shell. Wires 213 are electrically insulated or isolated from wires 215 within cable 218. In one embodiment of step 1012, wires 213 and 215 may be grouped to form cable 218 at second end 205 of probe 200. In another embodiment of step 920, wires 213 and 215 may be grouped to form cable 218 at back end 219 of probe 200. In an embodiment of step 1012, a plug and/or transceiver (e.g., 802) is electrically coupled to wires 213 and 215, within cable 218, at an end of cable 218.

In step 1014, a handle is molded around a portion of probe 200. In an embodiment of step 1014, handle 210 is formed around a portion of wires 213 and 215 (e.g., cable 118) and a portion of each of hollow tubes 206 and 208. In another embodiment, handle 210 is formed around the securing structure of step 1002 such that handle 210 will not release from probe 200. In an embodiment, handle 210 is made from high temperature resistant plastic. In step 1014, after it is formed, handle 210 provides a waterproof seal, preventing moisture from entering inside probe 200, such that probe 200 is waterproof. Furthermore, in step 1014, handle 210 retains structural and chemical integrity at cooking temperatures (for example, up to at least 500 degrees Fahrenheit).

It will be appreciated that steps 1002-1014 are not limited in scope to the order as illustrated in FIG. 10. Any combination of the above steps may be performed in parallel.

FIG. 15A-B depict an exemplary wireless dual-sensor waterproof temperature monitoring probe 1500, in an embodiment. FIG. 15A is a cross section view along the longitudinal axis of the probe 1500. FIG. 15B is a cross section view along section line A-A in FIG. 15A.

Wireless dual-sensor waterproof temperature monitoring probe 1500 is configured for in situ monitoring temperature of food during the cooking process. Probe 1500 includes a primary hollow tube 1506, with a first end 1504, an auxiliary hollow tube 1508, with first end 1524. Primary and secondary hollow tubes 1506 and 1508 have second ends 1505 and 1525, respectively. In an embodiment, second ends 1505 and 1525 are flush with each other. In certain embodiments, hollow tubes 1506 and 1508 at first ends 1504 and 1524, respectfully, are closed and/or sealed. In an embodiment, first end 1504 includes a pointed tip. Tubes 1506 and 1508 are parallel to each other. Tube 1508 may be shorter in length than tube 1506. Tube 1508 may have a smaller diameter than tube 1506. Hollow tubes 1506 and 1508 are attached to each other, for example by an adhesive or a welded joint. A food temperature sensor 1512 is positioned within primary hollow tube 1506 proximate first end 1504 and an ambient temperature sensor 1514 is positioned within auxiliary hollow tube 1508 at first end 1504. Probe 1500 further includes wires 1513 and wires 1515. Wires 1513 are electrically coupled to food temperature sensor 1512 and wires 1515 are electrically coupled to ambient temperature sensor 1514. In an embodiment, wires 1513 are electrically insulated or isolated from wires 1515 inside probe 1500. In one embodiment, sensor 1512 is coupled to wires 1513 and sensor 1514 is coupled to wires 1515 via copper clips or bump welds 1592.

First tube 1504 further includes, located therein, a power source 1530. Power source 1530 may be a rechargeable battery or a supercapacitor. In certain embodiments, the power source 1530 being a supercapacitor is advantageous because of the small size constraints of the probe 1500 and first tube 106. The power source 1530 may be located between the temperature sensor 1512 and the first end 1504 such that the power source 1530 is insulated from ambient heat via food that the probe 1500 is inserted into. In other words, during operation, the power source 1530 and the temperature sensor 1512 are located in the food that the probe 1500 is monitoring. Other configurations of the power source 1530 and the sensor 1512 may be utilized without departing from the scope hereof, such as the sensor 1512 located between the power source 1530 and the first end 1504.

The sensor 1512 and the power source 1530 are coupled to a wireless transceiver circuitry 1532. Wireless transceiver circuitry 1532 may receive data from one or both of the sensor 1512 and the power source 1530 and relay that data to an external device, such as an operator's mobile device (not shown), or a relay terminal (also not shown). In embodiments, wireless transceiver circuitry 1532 includes one or more of a wireless transceiver device 1534 (such as Bluetooth Low Energy, Bluetooth, Wi-Fi, or cellular module), a microprocessor 1536 (and associated memory), and a printed circuit board 1538 supporting the wireless transceiver device 1534 and/or microprocessor 1536. In embodiments, the wireless transceiver circuitry 1532 may also be located near the first end 1504 such that the wireless transceiver circuitry 1532 is protected from ambient heat from the food that the probe 1500 is monitoring in similar manner to the power source 1530 and the sensor 1512 discussed above. In alternate embodiments, the wireless transceiver circuitry 1532 is located near the second end 1505 in first tube 1506 such that a handle 1540 acts as a thermobarrier to protect the wireless transceiver circuitry 1532 from overheating during operation.

In one example of operation, a portion or all of tube 1506 is disposed within a food item and tube 1508 remains outside of the food item.

In one embodiment, one or both of primary and auxiliary hollow tubes 1506 and 1508, respectively, are made from metal such as stainless steel. In another embodiment, one or both of tubes 1506 and 1508 are made from high temperature resistant plastic. However, tubes 1506 and 1508 may be made from one or more other materials capable of substantially retaining structural and chemical integrity at cooking temperatures (e.g., at least 500 degrees Fahrenheit) without departing from the scope hereof. Each of outer surfaces 1507(O) and 1509(O) of hollow tubes 1506 and 1508, respectively, may have a non-stick coating (e.g., Teflon®), for ease of cleaning.

The handle 1540 may be formed from high-temperature-resistant material 1542 (e.g., material that maintains structural and chemical integrity up to about 500 degrees Fahrenheit). For example, the handle 1540 is formed of 20% glass-filled polyether ether ketone (PEEK), having a thermal conductivity of 0.29 $Wm^{-1}K^{-1}$. The material 1542 covers second ends 1505 and 1525, and a portion of the tubes 1506, 1508 such that the material 1542 seals the interior of the tubes 1506, and 1508. In one embodiment, the handle 1540 also includes a separation layer 1544 between first tube 1506 and second tube 1508. The separation layer 1544 may be a formed of Polytetrafluoroethylene (PTFE). Features, properties, function, and method of manufacture of handle 1540 are common with embodiments of handle 110, such providing a permanent waterproof seal that prevents moisture from entering inside probe 1500, including the inside of each of tubes 1506 and 1508. Probe 1500 may thereby be washed manually, soaked in water, or washed in an automatic dishwasher.

Wires 1515 exit tube 1508 and couple to a printed circuit board 1550. Furthermore, at least one wire 1552 couples to the printed circuit board 1550 from the wireless transceiver circuitry 1532. The material 1542 of the handle 1540 also surrounds the printed circuit board 1550, and wires 1515, and wires 1552 such that the printed circuit board 1550, and wires 1515, and wires 1552 are isolated from moisture during washing of the probe 1550. At least one contact pin 1554 is also coupled to the printed circuit board 1550. The at least one contact pin 1554 is configured for coupling to an exterior power supply for recharging the power source 1530. In an embodiment, the at least one contact pin 1554 is a power plug receptacle that is configured to receive power from a power plug, such as a micro USB power plug (or any other power plug known in the art). In an embodiment, the at least one contact pin 1554 is not included and the power source 1530 includes an inductive charging circuit for wireless charging of the power source 1530. In one aspect, the contact pins 1554 provide an advantage over conventional food temperature probes in that they do not use braided steel cabling. The braided steel cabling is susceptible to water leakage in the small gaps of the braided steel cabling. The contact pins 1554, on the other hand, do not include such small gaps and are therefore more water resistant than the braided steel cabling.

In certain embodiments, probe 1500 includes features common to corresponding embodiments of probe 200 such as a glass fiber tube, a first seal, a second seal, and/or a securing structure. For example, probe 1500 may include a glass fiber tube disposed within one or both of primary hollow tube 1506 auxiliary hollow tube 1508. For example, probe 1500 may include a first seal surrounding at least a part of each of the one or more glass fiber tubes. In an embodiment, probe 1500 may include a second seal (e.g., seal 1302, FIG. 13) surrounding portions of one or more of wires 1513, 1515, within respective tube 1506 or 1508, and wires 1552, where handle 1540 surrounds. The second seal may surround portions of respective hollow tube 1506 and/or 1508 to provide moisture protection, for example. The second seal provides thermal protection for respective wires 1513, 1515, and 1552 during probe operation and/or during manufacture of the probe (e.g., during high temperature mold injection). In another embodiment, probe 1500 may include a securing structure that prevents handle 1540 from separating from tubes 1506 and 1508. Probe 1500 may further include a third seal 1504, which is similar to third seal 1104, within hollow tube 1506 and at first end 1504 to provide additional electrical insulation between wires 1513 and hollow tube 1506.

Other embodiments of the dual-sensor waterproof temperature monitoring probes featured herein may have any combination of features of the probes discussed herein. For example, the probe 1500 may include the first support structure 270 and second support structure 272 discussed above with respect to probe 200.

Figure 16:
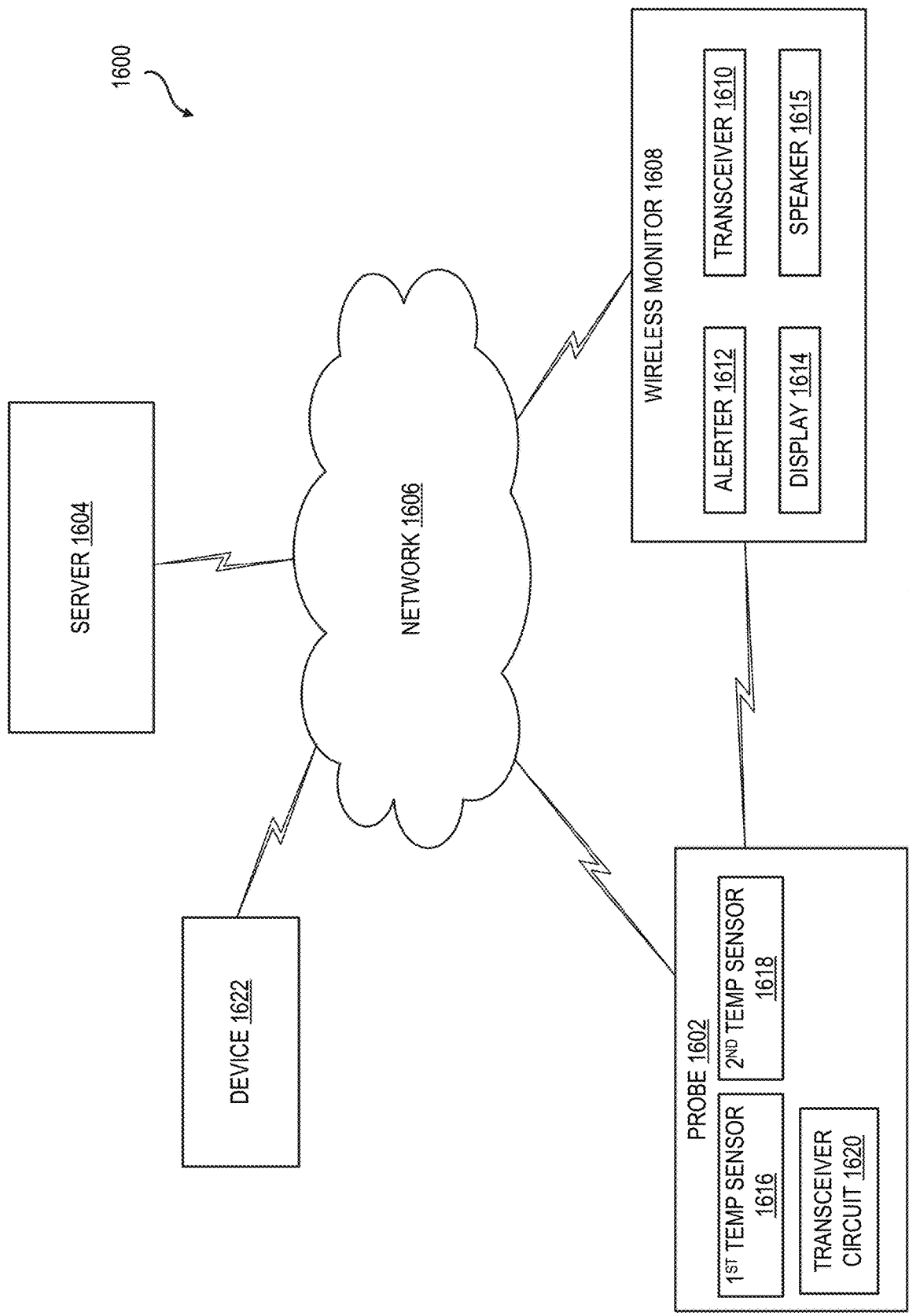
FIG. 16 depicts an example block diagram of a system for dual-temperature monitoring of food, in an embodiment.

FIG. 16 depicts an example block diagram 1600 depicting a system for dual-temperature monitoring of food, in an embodiment. System 1600 includes a probe 1602 and a cloud server 1604. The probe 1602 may be coupled to the server 1604 via a network 1606. The probe 1602 may be any of the probes discussed herein, including but not limited to probe 100, 200, and 1500. The network 1606 represents a wireless connection, such as a Wi-Fi, Bluetooth, Bluetooth Low Energy (BLE), Zigbee, or any proprietary low energy RF link or cellular connection. Server 1604 may be one or more computers executing computer readable instructions to transmit data to, or receive data from, one or more devices discussed with respect to FIG. 16, and analyze said data.

The probe 1602 may communicate with the server 1604 directly (via network 1606), or indirectly via a wireless monitor 1608. The wireless monitor 1608 may be a dedicated transceiver unit or a smart device such as a computer, smartphone, laptop, tablet, smart watch, etc. The wireless monitor 1608 may include a transceiver 1610 to receive data from the wireless probe 1602 and/or server 1604, and transmit data to the wireless probe 1602 and/or server 1604. The probe 1602 may communicate with the wireless monitor 1608 directly (e.g., separate from network 1606), or via the network 1606. The alerter 1612 may include a processor executing computer readable instructions that operate to analyze the data from the probe 1602 and alert an operator when the data meets certain predetermined conditions. For example, an operator, using the wireless monitor 1608, or a separate device (e.g., device 1622 discussed below), may provide settings that indicate what food the probe 1602 is monitoring, and a desired cooking temperature, or doneness level (e.g., rare, medium rare, medium, medium well, or well done).

The alerter 1612 may then analyze the temperature from one or both of the sensors within the probe 1602 to indicate one or both of a current doneness level, and a remaining cooking time. The current doneness level may be based on the temperature indicated by a first temperature sensor 1616. The remaining cooking time may be based on the temperature indicated by the first temperature sensor 1616 and a second temperature sensor 1618. The first temperature sensor 1616 may be the food temperature sensor 1512 of FIG. 15, for example. The second temperature sensor 1618 may be the ambient temperature sensor 1514 of FIG. 15, for example. In embodiments, the wireless monitor is optional, and the alerter 1612 is implemented directly on the probe 1602, such as within wireless transceiver circuitry 1620 of probe 1602. The wireless transceiver circuitry 1620 may be the same as the wireless transceiver circuitry 1532 of probe 1500.

When one or more conditions are met, the alerter 1612 may generate an alert that is displayed on the display 1614, or an audio alert that is sounded via a speaker 1615. In some embodiments, the alerter 1612 may generate an alert that is transmitted to a remote device 1622. The device 1622 may be a smartphone, smart watch, computer, smart TV, or other transceiver device used by the operator.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present system and method, which, as a matter of language, might be said to fall there between.

What is claimed is:

1. A dual-sensor waterproof temperature monitoring probe for continuously monitoring internal food temperature and ambient temperature, comprising:
   a first hollow tube formed with a first end and a second end;
   a food temperature sensor located within the first hollow tube proximate the first end;
   a second hollow tube formed with a first end and a second end, the second hollow tube having a shorter length than the first hollow tube and the second end flush with the second end of the first hollow tube;
   an ambient temperature sensor located within the second hollow tube;
   a rechargeable power source located in the first hollow tube proximate the first end;
   a handle permanently sealing the second end of each of the first and second hollow tubes.

2. The probe of claim 1, further comprising a pointed tip at the first end of the hollow tube.

3. The probe of claim 1, the handle configured to prevent water from entering the hollow tube and being capable of retaining structural and chemical integrity at temperatures up to about 500 degrees Fahrenheit.

4. The probe of claim 1, the power source being a rechargeable battery.

5. The probe of claim 1, the power source being a supercapacitor.

6. The probe of claim 1, the power source being located between the first temperature sensor and the first end of the first hollow tube.

7. The probe of claim 1, further comprising a wireless transceiver circuitry configured to obtain data from the first and second temperature sensors and transmit the data to an external device.

8. The probe of claim 7, the wireless transceiver circuitry including an alerter comprising a processor and memory storing computer readable instructions that when executed by the processor operate to:
   analyze the data to determine one or more of a current temperature and a remaining cook time, and
   generate an alert when the current temperature and/or the remaining cook time satisfy a predetermined condition.

9. The probe of claim 8, the predetermined condition being determined on settings received at the wireless transceiver circuitry from an external device.

10. The probe of claim 1, further comprising at least one contact pin configured to couple the power source to an external power supply to recharge the power source.

11. The probe of claim 10, the handle covering at least a portion of the at least one contact pin such that the internal components of the probe are sealed from moisture while the contact pin is configured to couple to the external power supply.

12. The probe of claim 10, the at least one contact pin coupled to a first printed circuit board, and the rechargeable power source coupled to a second printed circuit board, the second printed circuit board coupled to the first printed circuit board.

13. The probe of claim 12, the handle completely surrounding the first printed circuit board.

14. The probe of claim 12, the second printed circuit board being located in the first hollow tube.

15. The probe of claim 12, the second printed circuit board including wireless transceiver circuitry.

16. The probe of claim 1, further comprising an inductive charging circuit for wireless charging of the power source.

17. The probe of claim 1, further comprising a power plug receptacle for coupling the probe with a power plug.

18. The probe of claim 17, the power plug being a micro USB plug.

19. The probe of claim 1, the second hollow tube located adjacent the first hollow tube.

20. The probe of claim 1, the second hollow tube comprising a smaller diameter than the first hollow tube.

* * * * *